(12) United States Patent
Harrison, Jr.

(10) Patent No.: US 8,595,145 B2
(45) Date of Patent: Nov. 26, 2013

(54) ELECTRONIC BOND AND GUARANTY PROCESS AND BUSINESS METHOD

(75) Inventor: Shelton E. Harrison, Jr., Culver City, CA (US)

(73) Assignee: Shelton E. Harrison, Jr., Memphis, TN (US)

( * ) Notice: Subject to any disclaimer, the term of this patent is extended or adjusted under 35 U.S.C. 154(b) by 125 days.

(21) Appl. No.: 12/951,871

(22) Filed: Nov. 22, 2010

(65) Prior Publication Data

US 2011/0066523 A1   Mar. 17, 2011

Related U.S. Application Data

(60) Continuation of application No. 11/692,712, filed on Mar. 28, 2007, now Pat. No. 7,853,515, which is a division of application No. 09/848,639, filed on May 3, 2001, now Pat. No. 7,343,339.

(60) Provisional application No. 60/201,483, filed on May 3, 2000.

(51) Int. Cl.
   *G06Q 99/00* (2006.01)
(52) U.S. Cl.
   USPC .................. 705/317; 705/26.1; 705/26.35
(58) Field of Classification Search
   USPC ............................................. 705/26.1–27.2
   See application file for complete search history.

(56) References Cited

U.S. PATENT DOCUMENTS

| | | | |
|---|---|---|---|
| 3,573,747 A | 4/1971 | Adams et al. | |
| 3,581,072 A | 5/1971 | Nymeyer | |
| 4,734,564 A | 3/1988 | Boston et al. | |
| 4,789,928 A | 12/1988 | Fujisaki | |
| 4,831,526 A | 5/1989 | Luchs et al. | |
| 5,025,138 A | 6/1991 | Cuervo | |
| 5,375,055 A | 12/1994 | Togher et al. | |
| 5,523,942 A | 6/1996 | Tyler et al. | |
| 5,644,727 A | 7/1997 | Atkins | |

(Continued)

FOREIGN PATENT DOCUMENTS

| | | |
|---|---|---|
| WO | 01/44183 | 12/1999 |
| WO | 00/55791 | 9/2000 |
| WO | 02/15089 | 2/2002 |

OTHER PUBLICATIONS

"Digital Signature Management" Hassler, Vesna; Biely, Helmut. Internet Research 9. 4 (1999): 262-271. Retrieved via ProQuest.*

(Continued)

*Primary Examiner* — Michael Misiaszek
(74) *Attorney, Agent, or Firm* — Greenblum & Bernstein, P.L.C.

(57) ABSTRACT

Disclosed is a method by which suretyship bonds and guaranties can be purchased and deployed over the Internet in real time, providing automatic application evaluation and policy binding. The principal's credit card information is used in a repeating cycle of pre-authorized charges so that the card account serves as effective collateral. A bond seal image, safeguarded against piracy, appears in Web pages indicating the existence of bond coverage. A dynamically updated gauge displays the margin of coverage available under the bond at any given moment. Means of integrating the information technology of auction site and surety company are also disclosed. The invention makes possible an unprecedented level of security in user-to-user auction environments and eliminates the need for online escrow services. Means of accepting bidder deposit accounts is also disclosed, enabling automatic, electronic payment the moment an Internet auction closes and eliminating the need for online payment services.

23 Claims, 22 Drawing Sheets

(56) References Cited

U.S. PATENT DOCUMENTS

| | | | |
|---|---|---|---|
| 5,673,402 A | 9/1997 | Ryan et al. | |
| 5,704,045 A | 12/1997 | King et al. | |
| 5,732,400 A | 3/1998 | Mandler et al. | |
| 5,794,207 A | 8/1998 | Walker et al. | |
| 5,826,244 A | 10/1998 | Huberman | |
| 5,832,447 A | 11/1998 | Rieker et al. | |
| 5,835,896 A | 11/1998 | Fisher et al. | |
| 5,862,223 A | 1/1999 | Walker et al. | |
| 5,884,274 A | 3/1999 | Walker et al. | |
| 5,890,138 A | 3/1999 | Godin et al. | |
| 5,897,620 A | 4/1999 | Walker et al. | |
| 5,903,882 A | 5/1999 | Asay et al. | |
| 5,948,103 A * | 9/1999 | Fukuzaki | 726/27 |
| 5,949,885 A | 9/1999 | Leighton | |
| 5,974,441 A | 10/1999 | Rogers et al. | |
| 5,987,140 A | 11/1999 | Rowney et al. | |
| 6,055,518 A | 4/2000 | Franklin et al. | |
| 6,058,379 A | 5/2000 | Odom et al. | |
| 6,076,072 A | 6/2000 | Libman | |
| 6,088,686 A | 7/2000 | Walker et al. | |
| 6,161,099 A | 12/2000 | Harrington et al. | |
| 6,202,051 B1 | 3/2001 | Woolston | |
| 6,208,973 B1 | 3/2001 | Boyer et al. | |
| 6,285,991 B1 | 9/2001 | Powar | |
| 6,338,050 B1 | 1/2002 | Conklin et al. | |
| 6,393,417 B1 | 5/2002 | De Le fevre | |
| 6,405,177 B1 | 6/2002 | DiMattina | |
| 6,466,917 B1 | 10/2002 | Goyal et al. | |
| 6,473,740 B2 | 10/2002 | Cockrill et al. | |
| 6,493,685 B1 | 12/2002 | Ensel et al. | |
| 6,549,888 B1 | 4/2003 | Aieta et al. | |
| 6,557,009 B1 | 4/2003 | Singer et al. | |
| 6,578,014 B1 | 6/2003 | Murcko, Jr. | |
| 6,601,761 B1 | 8/2003 | Katis | |
| 6,609,113 B1 | 8/2003 | O'Leary et al. | |
| 6,615,226 B1 | 9/2003 | Hartman et al. | |
| 6,658,394 B1 | 12/2003 | Khaishgi et al. | |
| 6,701,303 B1 | 3/2004 | Dunn et al. | |
| 6,766,307 B1 | 7/2004 | Israel et al. | |
| 6,877,135 B1 * | 4/2005 | Kamiwada et al. | 715/210 |
| 7,020,634 B2 | 3/2006 | Khaishgi et al. | |
| 7,092,912 B2 | 8/2006 | Khaishgi et al. | |
| 7,343,339 B2 | 3/2008 | Harrison, Jr. | |
| 7,853,515 B2 | 12/2010 | Harrison, Jr. | |
| 2002/0013767 A1 | 1/2002 | Katz | |
| 2002/0077941 A1 | 6/2002 | Halligan et al. | |
| 2002/0129255 A1 * | 9/2002 | Tsuchiyama et al. | 713/176 |
| 2003/0033244 A1 | 2/2003 | Feig et al. | |
| 2004/0059638 A1 | 3/2004 | Aieta et al. | |
| 2004/0128155 A1 | 7/2004 | Vaidyanathan et al. | |

OTHER PUBLICATIONS

Plaintiffs Original Complaint.
Defendant Ubid.com Holdings, Inc's Answer to Complaint.
Answer and Counterclaims of Defendant Bidz.com, Inc.
Defendant Ebay Inc.'s Answer, Affirmative Defenses and Counterclaim to Plaintiff's Original Complaint.
Honesty.com, as downloaded from Archive.org on Apr. 3, 2007 with an archive date of Aug. 24, 1999 indicated at the Archive.org website, 3 pages.
Honesty.com, as downloaded from Archive.org on Apr. 3, 2007 with an archive date of Aug. 15, 2000 indicated at the Archive.org website, 2 pages.
Plagiarism.org, with a copyright date of 1998-2001, as downloaded from Archive.org on Apr. 3, 2007 with an archive date of Feb. 1, 2001 indicated at the Archive.org website, 2 pages.
Plagiarism.org, with a copyright date of 1999, as downloaded from Archive.org on Apr. 4, 2007 with an archive date of Apr. 27, 1999 indicated at the Archive.org website, 2 pages.
Simplebond Insurance Services, 3 pages, including a letter dated Jun. 12, 2003.
Billpoint, "Ebay Online Payments: Step 1", 2001, San Jose, CA, USA, www.billpoint.com as stored at www.archive.org.
Billpoint, "Ebay Online Payments: Step 2", 2001, San Jose, CA, USA, www.billpoint.com as stored at www.archive.org.
Billpoint, "Ebay Online Payments: Step 3", 2001, San Jose, CA, USA, www.billpoint.com as stored at www.archive.org.
Escrow.com, "Guiding Buyers and Sellers Safely through the Online Escrow Process", 2003, Unknown city, CA, USA, www.escrow.com.
Escrow.com, "How does Escrow.com protect against fraud?", 2003, Unknown city, CA, USA, www.escrow.com.
Escrow.com, "How long does the Escrow process take?", 2003, Unknown city, CA, USA, www.escrow.com.
Escrow.com, "How does Escrow.com protect me?", 2003, Unknown city, CA, USA, www.escrow.com.
Ironport, "Guaranteed Delivery of Legitimate Email", 2002, Unknown city, www.bondedsender.com as stored at www.archive.org.
Investopedia, "Irrevocable Letter of Credit—ILOC," 2004, Unknown city, www.investopedia.com.
Unknown Author, "Straight Irrevocable Letter of Credit" contract, unknown date and city.
Netquote, "NetQuote—We help you find the right prospects," 1997, unknown city, www.netquote.com as stored at www.archive.org.
Netquote, "Business Insurance Quote Request," 1999, unknown city, www.netquote.com as stored at www.archive.org.
South Coast Surety, "Will solve your bonding problems," 1998, unknown city, www.southcoastsurety.com as stored at www.archive.org.
South Coast Surety, "Surety questions and answers," 1998, unknown city, www.southcoastsurety.com as stored at www.archive.org.
South Coast Surety, "Will solve your clients bonding problems," 1998, unknown city, www.southcoastsurety.com as stored at www.archive.org.
Suretybondnet, "The Only On-Line Surety Bond Internet Resource," 1999, Chicago, IL, USA, www.suretybondnet.com, as stored at www.archive.org.
Rosenberg & Parker Surety Bonds, "Online Client Services," 1998, Bala Cynwyd, PA, USA, www.suretybond.com as sored at www.archive.org.
Escrow.com, "The buyer has to select a payment method", 2004, unknown city, CA, USA, www.escrow.com.
Escrow.com, "You have submitted the domain name transfer", 2004, unknown city, CA, USA, www.escrow.com.
Surety.com, "Who is Surety Technologies?", 1999, Reston, VA, USA, www.surety.com as stored at www.archive.org.
Black's Law Dictionary, "Suretyship bond," West Publishing, St. Paul, MN, 1990 (1 page).
Black's Law Dictionary, "Surety" definition, ed, 2 pages.
Black's Law Dictionary, "Suretyship" definition, 1 page.
Black's Law Dictionary, Suretyship, Contract of definition, 1 page.
Black's Law Dictionary, "Guaranty" definition, 2 pages.
Yahoo, "Yahoo Non-Paying Bidder Process," 2004, Santa Clara, CA, USA, www.yahoo.com.
Moses, Margaret, "Controlling the Letter of Credit Transaction," Unknown date & time.
Paypal, "User Agreement for PayPal Sevice," www.paypal.com, 2003, unknown city (11 pages).
Paypal, "Winning Buyer notification," www.paypal.com, 2003, unknown city (1 page).
Paypal, "End of auction notification," www.paypal.com, 2003, unknown city (1 page).
Paypal, "Seller Overview," www.paypal.com, 2003, unknown city (1 page).
Paypal, "Getting started: How do I send money," www.paypal.com, 2003, unknown city (1 page).
Paypal, "Getting started: How do I receive money," www.paypal.com, 2003, unknown city (1 page).
Paypal, "How secure are paypal transactions," www.paypal.com, 2003, unknown city (1 page).
Paypal, "What if I do not receive the item I expected," www.paypal.com, 2003, unknown city (1 page).
Paypal, "Seller protection policy," www.paypal.com, 2003, unknown city (2 pages).
Paypal, "Buyer Complain Policy," www.paypal.com, 2003, unknown city (2 pages).

(56) References Cited

OTHER PUBLICATIONS

Escrow.Com, "Guiding Buyers and Sellers . . . " www.escrow.com, 2003 (1 page), unknown city.
Escrow.Com, "How Does Escrow protect against fraud," www.escrow.com, 2003 (1 page) unknown city.
Yahoo Paydirect, "Send Money to Someone Else?", www.yahoo.com 2003 (1 p.).
Yahoo Paydirect, "Accept Money someone has sent me?", www.yahoo.com 2003 (1 p.).
Yahoo Paydirect, "How do i use Paydirect on my web site . . . ?", www.yahoo.com 2003 (1 p.).
Escrow.Com, "How Does Escrow protect me," www.escrow.com, 2003 (1 page).
Yahoo Paydirect, "Yahoo paydirect terms of service", www.yahoo.com 2003 (14 p.).
Yahoo Paydirect, "How Does Yahoo Paydirect work?", www.yahoo.com 2003 (3 p.).
PCWorld.Com, "Auction Payment sites . . . " pcworld.com, 2000, unknown city. (3 p.).
Federal Trade Commission "Internet Auction Fraud . . . ", FTC, www.ftc.gov, Wash., DC. 4 pages.
Steiner, Ina; "FTC Says Internet Auction . . . " www.auctionbytes.com (5 pages) unknown city, Jan. 24, 2002.
Auction Bytes, "What to do if you are ripped off online," (3 pages) unknown city, 2003.
Auction Bytes, "Online Payment services," (4 pages) unknown city, Nov. 2003.
Paypal, "PayPal Merchant Tools," www.paypal.com, May 21, 2003, unknown city (24 pages).
Kilcullen et al., "Construction Surety Bonds in Plain English," 1996, unknown city (7 pages).
Kilcullen et al., "How Surety Bonds Work," 1996, unknown city (7 pages).
Cruz, Mike: "Passing the Buck," Computer Reseller News, CMP Media (2 pages), Manhasset, NY, 2000.
Auction Universe online auctions, Auction Universe, at least Sep. 1999.
Rebound online auctions, Rebound, at latest Apr. 2000.
iCollector online auctions, Interactive Collector Limited, at latest Nov. 1999.
TradeSafe payment service used with online auctions, Tradesafe.com, Inc., at latest Feb. 2000.
Credit cards used with online auctions, e.g., eBay Inc., at latest Jun. 1999.
Billpoint used with eBay online auctions, eBay Inc., at latest Nov. 1999.
eBay online auctions (SafeHarbor "Insurance" program), eBay Inc., at latest May 1999.
eBay Great Collections online auctions, eBay Inc., at latest Nov. 1999.
eBay.co.uk online auctions (SafeHarbor "Insurance" program), eBay Inc., at latest Feb. 2000.
eBay.de online auctions (SafeHarbor "Insurance" program), eBay Inc., at latest Nov. 1999.
Amazon.com online auctions ("Auction Guarantee"), Amazon.com, Inc., at latest Mar. 1999.
Amazon.com online auction s("A to Z Guarantee"), Amazon.com, Inc., at latest Sep. 1999.
Amazon.co.uk online auctions ("A to Z Guarantee"), Amazon.com, Inc., at latest Nov. 1999.
Sothebys.Amazon.Com online auctions, Amazon.com, Inc., at latest Nov. 1999.
Government online auctions, U.S. Gov't., at latest Oct. 1996.
Safe Trade seal, SafeTrade Limited, at latest Mar. 2000.
Public Eye seals, Alliance of Premier Internet Retailers, at latest Mar. 1997.
Sothebys.com online auctions, Sotheby's, at latest Jan. 2000.
CatalogCity online sales, Catalog City, Inc., at latest Apr. 1999.
eBay online auctions (SafeHarbor "Escrow"), eBay Inc., at latest May 1999.
eBond online auction bonds, CIGNA P&C, Fiderus, at latest Jan. 1999.
eBay online auctions (SafeHarbor "Verified eBay User"), eBay Inc., at latest May 1999.
eBay online auctions (BBB seal), eBay Inc., at latest May 1999.
MuniAuction, MuniAuction, Inc., at latest Dec. 1998.
Auction Universe Home Page, http://web.archive.org/web/19990208003425/http://auctionuniverse.com, Feb. 8, 1999.
Auction Universe How to Use, http://web.archive.org/web/19990921123325/www.auctionuniverse.com/au/sharedcontent/how.asp?sv&idx, Sep. 21, 1999.
Auction Universe Current Bidsafe Auctions, http://web.archive.org/webII 9990907200350/www.auctionuniverse.com/au/bidsafe, Sep. 7, 1999.
Auction Universe FAQ, http://web.archive.org/web19990913120804/www.auctionuniverse.com/au/sharedcontent/fag.asp?sv=&idx=, Sep. 13, 1999.
AU webpage screenshot.sub.—Source for Ref. 1, http://web.archive.org/web/19990208003425/http://auctionuniverse.com/, Sep. 7, 1999.
Auction Universe Rules of the Road, http://web.archive.org/web/19990909023321/www.auctionuniverse.com/au/rules.as p?sv&idx, Sep. 9, 1999.
Auction Universe—FAQ(2), http://web.archive.org/web/1999090405471 4/www.auctionuniverse.com/au/bidsafe, Sep. 13, 1999.
Rebound Offers Maximum Trust, Minimal Risk for Buyers of Excess Inventory; Both Vendors and Products Are Validated Through SGSonSITE, Business Wire, Apr. 26, 2000.
Rebound webpage screenshot, http://web.archive.org/web/2000040717493 9/http://reb ound.com, Apr. 7, 2000.
Rebound webpage screenshot, http://web.archive.org/web/2000040710473 6/www.rebound.com/menuBuyer.msp, Apr. 7, 2000.
SGSonSite Homepage—Multi-color Seals, http://web.archive.org/web/20010408005035/www.sgsonsite.com/en/brochureware /index.jsp, Apr. 8, 2001.
SGS Rating Program, http://web.archive.org/web/20010408005035/www.sgsonsite.com/en/brochureware /index.jsp, Apr. 14, 2001.
Verify Vendor Seal, http://web.archive.org/web/ 20010408005035/www.sgsonsite.com/en/brochureware /index.jsp, Apr. 13, 2001.
Icollector webpage screenshot, http://web.archive.org/web/199910010520 34/http://www.icollector.com/index.html, Oct. 1, 1999.
Icollector webpage screenshot, http://web.archive.org/web/20000115 143 503/auction.icollector.com/os/itemhtml/ht5051 15.shtml?5051 15, Mar. 1, 2000.
Icollector plc Launches Highest Insurance Cover for E-Commerce Transactions, PR Newswire, Nov. 16, 1999.
Icollector webpage screenshot, http://web.archive.org/web/20000422200024/auction.icollector.com/cgibin/osa!sellpage.cgi?101576, Apr. 22, 2000.
Icollector webpage screenshot, http://web.archive.org/web/19990922093831/www.icollector.com/seller/index.html, Sep. 22, 2000.
Source for Ref. 12, http://web.archive.org/web/20000115 143503/auction.icollector.com/os/itemlitml/ht5051 15.shtml?5051 15, Feb. 29, 2000.
Iguarantee insurance/ terms and conditions, http://web.archive.org/web/ 20000816083306/www.icollector.com!IG/ins.html, Aug. 16, 2000.
Icollector click through, http://web.archive.org/web/20000511111238/www.icollector.com/IG/index2.html, May 11, 2000.
Icollector Online Auctions, Seller Terms and Conditions, http://web.archive.org/web/ 1999112716313 7/www.icollector.com/seller/terms.html, Nov. 27, 1999.
Providence, R.I., Attorney Sells Trust Over the Internet, Providence Journal-Bulletin, Timothy C. Barmann, Nov. 28, 1998.
TradeSafe.com's 'Buy Button' Connects Ecommerce Product Listings to Secure, Guaranteed Payment System, Business Wire, Apr. 7, 2000.

(56) References Cited

OTHER PUBLICATIONS

Opoly Enterprises Teams With Tradesafe.com to Protect Users Against Online Fraud, Business Wire, Apr. 25, 2000.
TradeSafe At-A-Glance Features Table, ecommerce-guide.com, Apr. 3, 2000.
Article depicting TradeSafe logo, http://www.netbanker.com/fleet.sub.—financial/, Apr. 3, 2000.
Tradesafe.com home page, http://web.archive.org/web/20000229184400/http://trad esafe.com, Feb. 29, 2000.
How Tradesafe Payments Work, http://web.archive.org/web/20000606070222/tradesafe.com/tspworks.cfm, Jun. 6, 2000.
The Tradesafe Payments Guarantee, http://web.archive.org/web/2000042300535 5/tradesafe.com/tspguarantee.cfm, Apr. 23, 2000.
Buyer's Guide, http://web.archive.org/web/ 200005251 73046/tradesafe.com/tspbuyer.cfm, May 25, 2000.
Tradesafe FAQs (Being a Buyer), http://web.archive.org/web/20000605022720/tradesafe.comcorn/fagbuyer.cfm, Jun. 5, 2000.
Tradesafe FAQs (Being a Seller), http://web.archive.org/web/20000604235488/tradesafe.corn/fag .cfm, Jun. 4, 2000.
Policies & Procedures, http://web.archive.org/web/20000605214024/tradesafe. corn/tspfine.cfm, Jun. 5, 2000.
Transactions over $1200, http://web.archive.org/web/20000605181921/tradesafe. corn/tsp 1 200.cfm, Jun. 5, 2000.
Welcome to Tradesafe Payments!, http://web.archive.org/web/200003051 53035/tradesafe. com/howitworks.cfm, Mar. 5, 2000.
20 Ways to Shop Smart Online; Gale Group, Inc., Apr. 1, 2000.
eBay Online Auctions, Muska & Lipman, Saklund, N., 1999.
Getting Started in Internet Auctions, John Wiley & Sons, Elliott, 2000.
eBay auction listing, http://cgi.ebay.corn/aw-cgi/eBayISAPI.dll?Viewlte m&iteml 19523043, Jun. 18, 1999.
NY Times rechargebacks "Personal Finance; Humbug: When Gifts Become Problems", NYTimes.com, Janice M. Horowitz, Dec. 24, 1989.
Bilipoint Overview: eBay Trust and Safety, eBay Inc., Apr. 11, 2000.
Billpoint Buyguide, http://web.archive.org/web/ 200005011223821/pages.ebay.com/help/buyerguide/bpbuyer.html, May 11, 2000.
Payment Options on eBay—"What Buyers Should Know About Payment Options on eBay", http://web.archive.org/webi 20000511055546/pages.eba y.com/help/buyerguide/paymenttips.html, May 11, 2000.
Rare Shrunken Head from Amazon Tribe! Item #289158639, http://web.archive.org/web/ 20001018093405/www.whattheheck.com/ebay/shrunke n. html, Mar. 20, 2000.
eBay 1998 Form 10-k, SEC, 1999.
eBay Home Page, eBay Inc., May 25, 1999.
Oct. 1999 item page, eBay Inc., Oct. 1, 1999.
Insurance Overview, http://web.archive.org/web/ 19990508165449/pages.ebay.com/aw/safeharborinsurance.html, May 8, 1999.
Insurance FAQ, http://web.archive.org/web/ 19990922033450/pages.ebay.com/aw/safeharbor-insfag.htm 1, Sep. 22, 1999.
Insurance Guidelines, http://web.archive.org/web/19991023033908/pages.ebay.com/aw/safeharbor-insguide.htm 1, Oct. 23, 1999.
Insurance Process, http://web.archive.org/web/1999050816361 5/pages.ebay.com/aw/safeharbor-insprocess.html, May 8, 1999.
The Great Collections Guarantee, http://web.archive.org/web/19991128204625/pages.gc.ebay.com/help/buyerguide/ warranty .html, Nov. 28, 1999.
Auction Houses> Butterfield & Butterfield, http://web.archive.org/web/ 19991127092704/pages.gc.ebay.com/buy/ah/butterfield.html, Nov. 27, 1999.
Standard Conditions of Sale, http://web.archive.org/web/19991127141008/pages.gc.ebay.com/services/buyandsell/standard condition.html, Nov. 27, 1999.
eBay.co Uk .home page, http://web.archive.org/web/ 200003041 32956/www.eba y.co.uk, Mar. 4, 2000.
U.K. Overview SafeHarbor, http://web.archive.org/web/20000229230443/pages.ebay.co.uk/services/safeharbor/safeharbor-insurance.html, Feb. 29, 2000.
U.K. Insurance FAQ SafeHarbor, http://web.archives.org/web/20000229171846/pages.ebay.co.uk/services/safeharbor/safeharbor-ins-fag.html, Feb. 29, 2000.
Insurance Guidelines SafeHarbor, http://web.archive.org/web/20000229192856/pages.ebay.co.uk/services/safeharbor/safeharbor-ins-guide.html, Feb. 29, 2000.
Insurance Process SafeHarbor, http://web.archive.org/web/20000229202308/pages.ebay.co.ukiservices/safeharbor/safe-harbor-ins-process.html, Feb. 29, 2000.
eBay Germany home page, http://web.archive.org/web/19991117163517/ebay.de, Nov. 17, 1999.
Guarantee (Die eBay Garantie Ubersicht), http://web.archive.org/web/ 199911281 15259/www.ebay.de/static2/get.sub.—ag.sub.—ubersich t.html, Jan. 1, 1999.
Guanrantee (eBay Garantie Fragen and Antworten), http://web.archive.org/web/20000302203554/www.ebay.de/static2/get.sub.—a- g.sub.—fag.html, Mar. 2, 2000.
Guarantee (eBay Auktions-Garantie Regein & Bedingungen), http://web.archive.org/web/20000302181 707/www.ebay.de/static2/get.sub.—ag.sub.—bedingungen.html, Mar. 2, 2000.
ebay.de about (Antworten auf Ihre Fragen zu eBay), http://web.archive.org/web/ 1999101214043 1/ebay.de/static/etc/getHilfe.html, Oct. 12, 1999.
Auctions & Collectibles, Forbes, Peter Kafka, Sep. 13, 1999.
Amazon.com, Annual Report Form 10-K, as filed with SEC, SEC, Mar. 24, 2000.
Amazon.com (2 pages), http://web.archive.org/web/1999101 2094725/auctionwatch.com/awdaily/reviews/amazon.html, Oct. 12, 1999.
Free Stuff for Collectors on the Internet, C&T Publishing, Helm and Hansen, Apr. 15, 2000.
Press Release "Amazon Launches Online Auction Site", prnewswires.com, Mar. 30, 1999.
Excerpt from Online Auctions! I Didn't Know You Could Do That . . . -(99), Sybex, 2000.
Online Auctions the Internet Guide for Bargain Hunters and Collectors, McGraw-Hill, O'Loughlin, L., Jan. 28, 2000.
Online Auctions! I Didn't Know You Could Do That . . . , Sybex, Frey, B., 2000.
Credit Card Management "Behind the Spree in Payments for C2C.", Thompson Co./ Faulkner & Gray Co., Apr. 1, 2000.
Amazon.com: A Z Guarantee, http://web.archive.org/web/ 19991128101704/s1.amazon.co.uklexec/varzealsubst/home/home.html, Nov. 28, 1999.
Amazon.com Investor Relations: Press Release "Sotheby's and Amazon.com Launch Sothebys.Amazon.com on Nov. 19, 1999", Amazon.com, Nov. 19, 1999.
"Sotheby's and Amazon.com Strike a Deal to Sell on Line New York Times", NY Times, Jun. 17, 1999.
Sotheby's.Amazon.com home page, http://web.archive.org/web/20000123074119/www.sothebys.amazon.com/exec/varzea/subst/home/sothebys.html, Jan. 23, 2000.
"Becoming Earths Biggest Bookstore Was Easy" (Advertisement), CIO Web Business, Nov. 1, 1997.
40 C.F.R 30.48 Title 40—Protection of Environment; Chapter I—Environmental Protection Agency; Part 30—Grants and Agreements with Institutions of High Education, Hospitals, and other Non-profit Organizations; Subpart C—Post-Award Requirements; Sec. 30.48—Contract provisions, US Government, Jul. 1, 1998.
Repair of GE Engine Test Cell, Commerce Business Daily, Jun. 30, 1998.
Small Firms, Big Contracts Reforms Allow Small Businesses to Compete for Government Work, Duluth News, Oct. 7, 1996.
40 C.F.R. 73.70 Title 40—Protection of Environment; Chapter I—Environmental Protection Agency; Part 73—Sulfur Dioxide Allowance System—Table of Contents; Subpart E—Auctions, Direct Sales, and Independent Power Producers Written Guarantee; Sec. 73.70 Auctions, US Government, Jul. 1, 1998.
govWorks.com Attracts Prominent Government Officials, Finance and Technology Executives to Board of Directors, Advisors, U.S. Newswire, Nov. 9, 1999.
Australia's Min-Tech 8 Gains Right to 20% Stake in Web Co, Asia Pulse, Nov. 5, 1999.

(56) References Cited

OTHER PUBLICATIONS

Partnership between ninemsn & SafeTrade Limited, AAP Company News, Mar. 16, 2000.
Managing security risks, The Advertiser, Mar. 25, 2000.
On-line Consumer Service Offers Most Expansive Credit Card Fraud Protection Program on the Internet; PR Newswire, Dec. 3, 1997.
PublicEye Online Home Page, http://web.archive.org/web/19970302042155/www.thepubliceye.com, Mar. 2, 1997.
PublicEye Online Review / Verification, http://web.archive.org/web/19971013103925/www.thepubliceye.com/confirm.htm, Oct. 13, 1997.
PublicEye Online Gold and Platinum Service, http://web.archive.org/web/19970302042731/www.thepubliceye.com/eye5 .htm, Mar. 2, 1997.
Sotheby's launches auction site: Sothebys.com will focus on fine art pieces and other items normally sold in live auction rooms, Vancouver Sun, Sara Marani, Jan. 13, 2000.
Buying, Selling, Stealing History: Online Bidding: A New Demand on Same Supply, The Atlanta Journal and Constitution, Mike Toner, Sep. 19, 1999.
Catalog City web page screenshot—Home Page, http://web.archive.org/ 19990117075724/www.catalogcity.com/home.cfm, Jan. 16, 1999.
Catalog City web page screenshot—About, http://web.archive.org/web/ 19990223201839/www.catalogcity.com/aboutus/, Feb. 23, 1999.
Catalog City web page screenshot—Listing, http://web.archive.org/web/ 19990508165436/www.catalogcity.com/seasonal/seasonal.cfm, May 8, 1999.
Catalog City web page screenshot—Guarantee, http://web.archive.org/web/19990418040348/www.catalogcity.com/customerservice/guarantee.cfm, Apr. 1, 1999.
Closed Auction with iEscrow, http://web.archive.org/web/19990827124710/cgi.ebay.com/awcgi/eBayISAPI.dll?ViewItem&itern91 860554, Aug. 27, 1999.
iEscrow Process, http://web.archive.org/web/ 19990508224517/pages.ebay.com/aw/iescrow-help.html, May 8, 1999.
FairMarket home page, http://web.archive.org/web/ 19990125084718/auctions.fairmarket.com/, Jan. 25, 1999.
CityAuction home page, http://web.archive.org/web/19990218151932/http://www.cityauction.com/, Feb. 18, 1999.
2TheMart.com, Inc. Announces That IBM Is Building Its Ecommerce Auction Site to Compete With Ebay and Amazon, Business Wire, Jun. 4, 1999.
CIGNA e-bond email to CityAuction, CIGNA, Jan. 18, 1999.
CIGNA e-bond email to eBay, CIGNA, Jan. 18, 1999.
CIGNA e-bond email and presentation to Fairmarket, CIGNA, Jan. 29, 1999.
CIGNA e-bond email and presentation to Yahoo, CIGNA, Jan. 29, 1999.
CIGNA e-bond email to 2TheMart, CIGNA, Jan. 20, 1999.
CIGNA eBond prototype (ebond.zip), CIGNA, Apr. 2, 1999.
Yahoo Auctions, http://web.archive.org/web 19990208003424/auctions.yahoo.com, Feb. 8, 1999.
AICP Announces Bell Canada Receives CA Webtrust Seal of Assurance from Ernst & Young, Business Wire, Mar. 16, 1999.
Auction on the internet—A Preliminary study, home.ust.hklantzwick/Internet.sub.—Auction.html, Kevin Chui and Rami Zwick, Jan. 1, 1999.
BBBOnline trademark registration, USPTO (TESS), Jun. 2, 1998.
BBBOnline trademark registration, USPTO (TESS), May 23, 1997.
BBBOnline trademark registration, USPTO (TESS), Jan. 6, 1999.
BBBOnline trademark registration, USPTO (TESS), Apr. 30, 1999.
BBBOnline trademark registration, USPTO (TESS), Oct. 23, 2001.
BBBOnline trademark registration, USPTO (TESS), Feb. 12, 2001.
Butterfield Auction, Butterfield, Apr. 24, 1997.
Buyers beware: Internet auctions not regulated, USA Today, Dhristina Valdez Diaz, Sep. 3, 1997.
Christie's Specialists and Services for this Sale (The Denver Art Museum Auction), Christie's New York, Sep. 16, 1995.
Christie's Specialists and Services for this Sale—Property From the Collection of Henry Geldzahler, Christie's New York, May 8, 1996.
eBay Help : Seller Guide : List it! : Gift Icon, http://web.archive.org/web/ 19991011033102/pages.ebay.com/help/sellerguide/gifticon.html, 1999.
eBay Launches the Most Comprehensive Trust and Safety Upgrades to the World's Largest Person-To-Person Trading Site, prnewswire.com, Jan. 15, 1999.
Evaluating the Proposed Test Drawdown and Sale of Strategic Petroleum Reserve Oil, RAND Corporation, Kohler et al., Oct. 1, 1985.
eWanted Frequently Asked Questions (FAQ):, http://web.archive.org/web 19991128173800/www.ewanted.com/tutorial/faqs.cfm, Nov. 28, 1999.
Federal Trade Commission, "Consumer Protection in the Global Electronic Marketplace: Summary of Federal Trade Commission Workshop, Jun. 8-9, 1999", Federal Trade Comission, Jun. 9, 1999.
Insurance Principles and Practices, Prentice Hall, Riegel-and-Loman, 1922.
On the Provision of Replicated Internet Auction Services, Proceedings of the 18th IEEE Symposium on Reliable Distributed Systems, p. 390, F. Panzieri, S.K. Shrivastava, Oct. 18, 1999.
Online Auctions at eBay, Prima Publishing, Price, D., Apr. 27, 2000.
Power Sellers Program, pages.ebay.com/services/buyandsell/powersell/powersellers.html, Aug. 24, 1999.
Sale Inquiries and Information (Glenbow Museum Auction), Sotheby's, Apr. 23, 1994.
The Design and Implementation of a Secure Auction Service, IEEE Transactions, Matthew K. Franklin, Michael K. Reiter, May 1, 1996.
The Economic Value of the Auction as a Distributor of Perishable Commodities, Proceedings of the 2nd Pan American Scientific Congress (G. Swiggert, ed.) (Washington Government Printing Office), US Government, McElheny, Jan. 8, 1916.
The Electronic Frontier, Journal of Accountancy, Gray, G. & Debreceny, R., May 1, 1998.
The Only On-line Mortgage Bond Information and Application Resource Center, http://web.archive.org/web/19990128104359/www.mortgagebondnet.com/mbnhom e.htm, Jan. 28, 1999.
The Only On-line Surety Bond Internet Resource Center, http://web.archive.org/web/ 19990222003523/www.suretybondnet.com/suretyhome.htm, Feb. 22, 1999.
The Production of Trust in Online Markets, Advances in Group Processes, Kollock, P., Jun. 21, 1905.
Verified eBay User Overview, http://web.archive.org/web/19990508181948/pages.ebay.com/aw/safeharborverified.html, May 8, 1999.
Web trust; a seal of approval, Internal Auditor, Cashell, J., Jun. 1, 1999.
WebTrust TM Principles and Criteria for Business-to-Consumer Electronic Commerce, AICPA, Jul. 1, 1999.
BBBOnline trademark registration, USPTO (TESS), Feb. 12, 2000.
Internet Auctions for Dummies, IDG Books Worldwide, Inc., Greg Holden, 1999.
"Accepting Credit Cards When You Sell Items: ProPay and Billpoint Payment Services", Auctionbytes, Ina Steiner, Jun. 17, 2000.
"E-Payment Providers Take eBay by Storm", netbanker.com, Jim Bruene, Feb. 4, 2000.
eBay Online Payments Quick Tour, web.archive.org/web/20010309131222/www.billpoint.com, Mar. 9, 2001.
NotaryBondNet, www.mortgagebondnet.com/nbnrateshome.htm, Jan. 18, 1999.
Documents reTradeSafe seal, Ebay-TA 00743-754, 1999-2000.
Simplebond.com, P-0089 14-8916, Feb. 2000.
Surety Bonds for Construction Contracts, ASCE Press, Jeffrey S. Russell, 1999.
The personal Touch, Economist, Aug. 3, 2000.
Amazon offers small sellers cyber shelfspace, Reuters, Brendan Itindola, Sep. 29, 1999.
The Complete Idiot's Guide to Online Auctions , QUE, Michael Miller, 1999.
Preliminary Official Statement Dated Sep. 18, 1998 for County of Volusioa, Florida Subordinate Lien Sales Tax Revenue Bonds, Series 1998, MuniAuction, Sep. 19, 1998.
MBIA Inc. Form 10-K filed Mar. 30, 1998, SEC, Mar. 30, 1998.

(56) References Cited

OTHER PUBLICATIONS

MuniAuction home page, http://web.archive.org/web/19981212015806/http://muniauction.com!, Dec. 12, 1998.
MuniAuction Frequently Asked Questions, http://web.archive.org/web/20000303041037/http://muniauction.com/faq.html, Mar. 3, 2000.
Over $1 Billion Sold: MuniAuction Races Past Milestone in Portland and Volusia County Auctions, http://web.archive.org/web/19990826091339/muniauction.com/vol.html, Aug. 26, 1999.
MuniAuction Conducts 3 Successful Electronic GIC Sales Totaling $284.6 Million, http://web.archive.org/web/20000114224037/muniauction.com/gic2.html, Jun. 29, 1999.
MuniAuction Brochure—p. 2, http://web.archive.org/web/19990128210308/muniauction.com/information/, Jan. 28, 1999.
What They're Saying About MuniAuction, http://web.archive.org/web/19990128210308/muniauction.com/information/, Jan. 28, 1999.
MuniAuction—Instructions, http://web.archive.org/web/199901282 10308/muniauction.com/information/, Jan. 28, 1999.
MuniAuction Brochure—p. 3, http://web.archive.org/web/19990829202641/http://www.muniauction.com/infomation/brochure3.html, Aug. 29, 1999.
MuniAuction Brochure—p. 4, http://web.archive.org/web/19991012083155/http://muniauction.com/information/brochure4.html, Oct. 12, 1999.
AON Best Bid, http://web.archive.org/web/20010504050638/http://www.muniauction.com/results/VolusiaCnty.FL.Series1998. AON/bestbids.html, May 4, 2001.
Bid Summary, http://web.archive.org/web/20010504041523/http://www.muniauction.com/results/PubAudAuthPghAlleghCy .1999.CapI.GIC/bidsumma ry.html, May 4, 2001.
The Handbook of Municipal Bonds and Public Finance, New York Institute of Finance, Lamb et al, 1993.
The Municipal Bond Handbook, Dow Jones-Irwin, Fabozzi et al., 1983.
Investing in Municipal Bonds—Balancing Risks and Rewards, John Wiley & Sons, James J. Cooner, 1987.
Summary Notice of Bond Sale—Volusia County, Florida, The Bond Buyer, Sep. 18, 1998.
Bilipoint Tutorial (Ebay—TA 9594), http://web.archive.org/web/20000511 222532/www.billpoint.com/help/tutorial.html, May 11, 2000.
eBay Help : Seller Guide : Accept credit cards from winning bidders! (Ebay—TA 9599), http://web.archive.org/web/ 2000051012 1717/pages.ebay.com/help/sellerguide/bpsellers.html, May 10, 2000.
Buyer Guide: Problems With Your Order (Ebay—TA 9567), http://web.archive.org/web/20000302133948/www.billpoint.com/help/buyerguide/problem.html, Mar. 2, 2000.
ebay Pilot Program FAQ (Ebay—TA 9539), http://web.archive.org/web/20000301013324/www.billpoint.com/help/pilotfaq-.htm, Mar. 1, 2000.
Seller Guide: Refunds / Chargebacks (Ebay—TA 9552), http://web.archive.org/web/20000301101705/www.billpoint.com/help/sellerguide/refunds.html, Mar. 1, 2000.
eBay home page (Ebay—TA 9055), eBay Inc, Apr. 28, 1999.
eBay item page (Ebay-TA 9056), eBay Inc., Feb. 4, 2000.
Los Angeles Times, "Auction Sites' Popularity Spawns Escrow Services", Michelle V. Rafter, Mar. 2, 1998.
i-Escrow Inc.—Terms of Service, http://web.archive.org/web/19990422053904/www.iescrow.com/terms.html, Apr. 29, 1999.
i-Escrow Inc.—Financial Questions, http://web.archive.org/web/1999041810245 8/www.iescrow.com/finfaq.html, Apr. 18, 1999.
i-Escrow—Insurance Questions, http://web.archive.org/web/1999101310 32/iescrow.com/insfaq.html, Oct. 13, 1999.
FTC Consumer Alert, http://web.archive.org/web/20000301113646/www.ftc.gov/bcp/conline/pubs/alerts/gonealrt.htm, Feb. 2000.
The Wall Street Journal, Section' Technology; p. B6, Aug. 1, 2000 Tuesday, X.com's PayPal Will Reimburse Consumers Defrauded Online, Load-Date: Dec. 5, 2004 (Ebay-TA00015318-Ebay-TA00015319).
Terms of Use, User Agreement for X.com's PayPal.TM. Service (Ebay-TA00015320-Ebay-TA00015329), Undated.
PayPal, The way to send and receive money online, indicating from site http://web.archive.org/web/20001011212217/http://x.com/ with an indicated date of Jul. 7, 2009 (Ebay-TA00015330).
"FYI, Paypal email", indicated date of Oct. 9, 2000 (Ebay-TA00015331-Ebay-TA00015332).
X.com's PayPal, PayPal, a free service of X.com, Policy Changes, undated (Ebay-TA00015333-EBAYTA00015334).
"FW: ebay and PayPal logos", indicated date of Oct. 16, 2000 (Ebay-TA00015335—Ebay-TA00015345.
What They're Saying About MuniAuction, indicating from site http://web.archive.org/web/20000303145940/muniauction.com/quotes.html with an indicated date of May 29, 2009 (Ebay-TA00015119-Ebay-TA00015122).
MuniAuction—Instructions, indicating from site http://web.archive.org/web/19991003221644/muniauction.com/instructions/ with an indicated date of May 29, 2009 (Ebay-TA00015123-Ebay-TA00015125). cited by other.

\* cited by examiner

**Typical Internet Auction
or Other eCommerce Transaction

**Bonded or Guaranteed
Internet Auction or Other
eCommerce Transaction

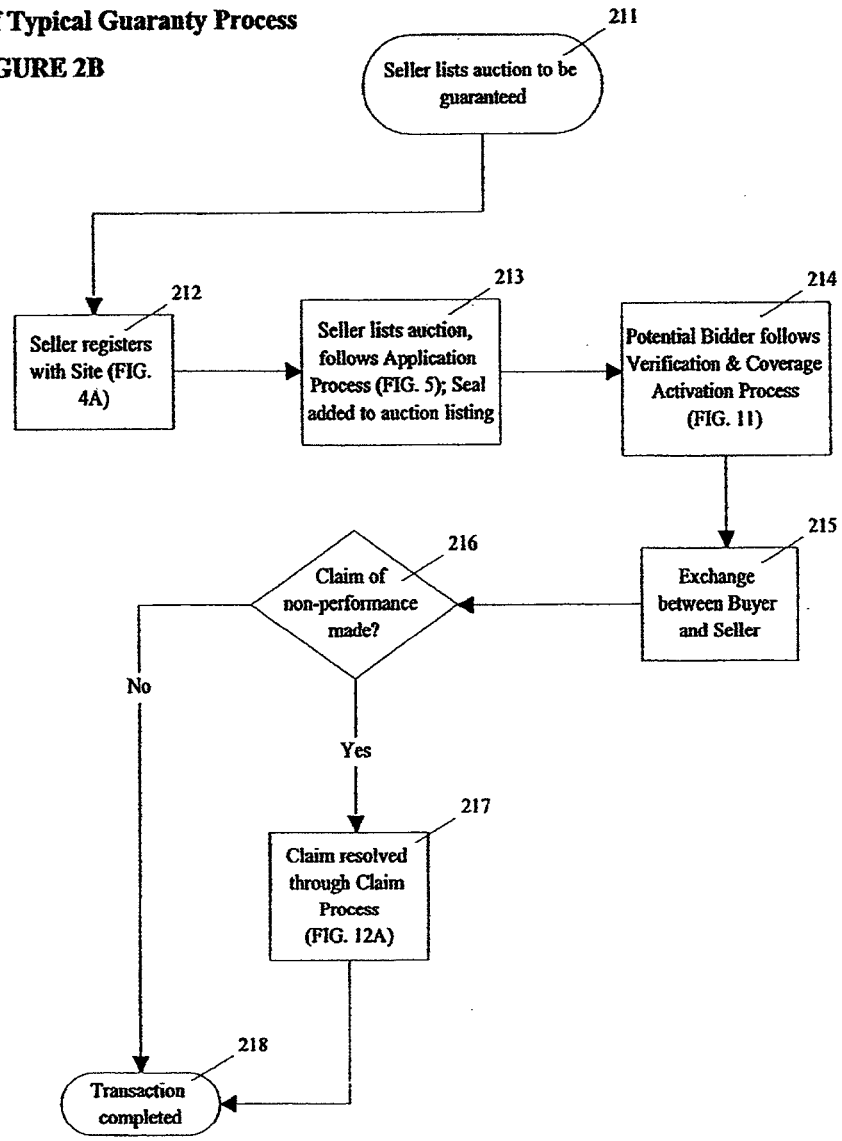

Typical Internet Auction
or Other eCommerce Transaction
Using Escrow Service

Registration Process
FIGURE 4A
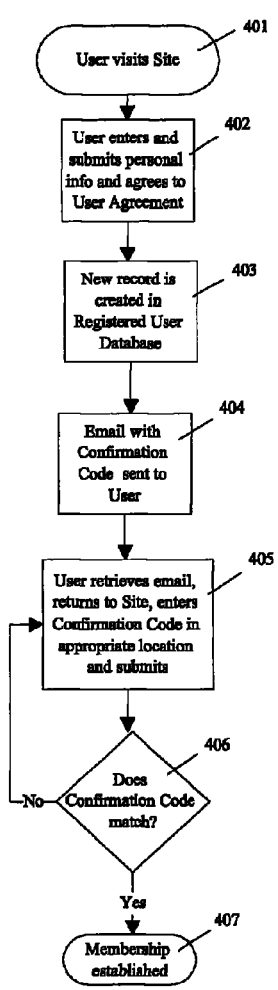
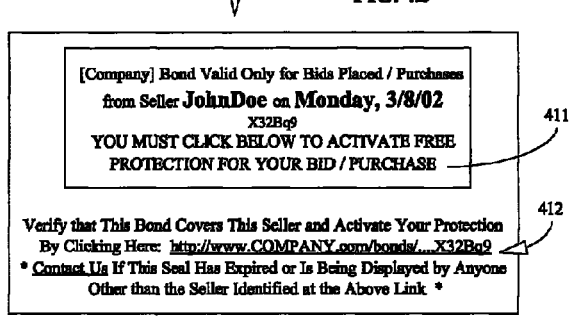
Digital Bond Seal
FIG. 4B
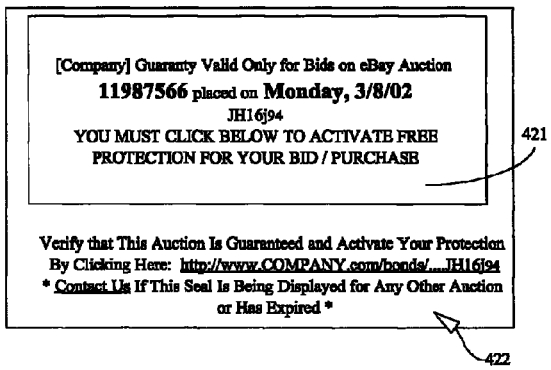
Digital Guaranty Seal
FIG. 4C

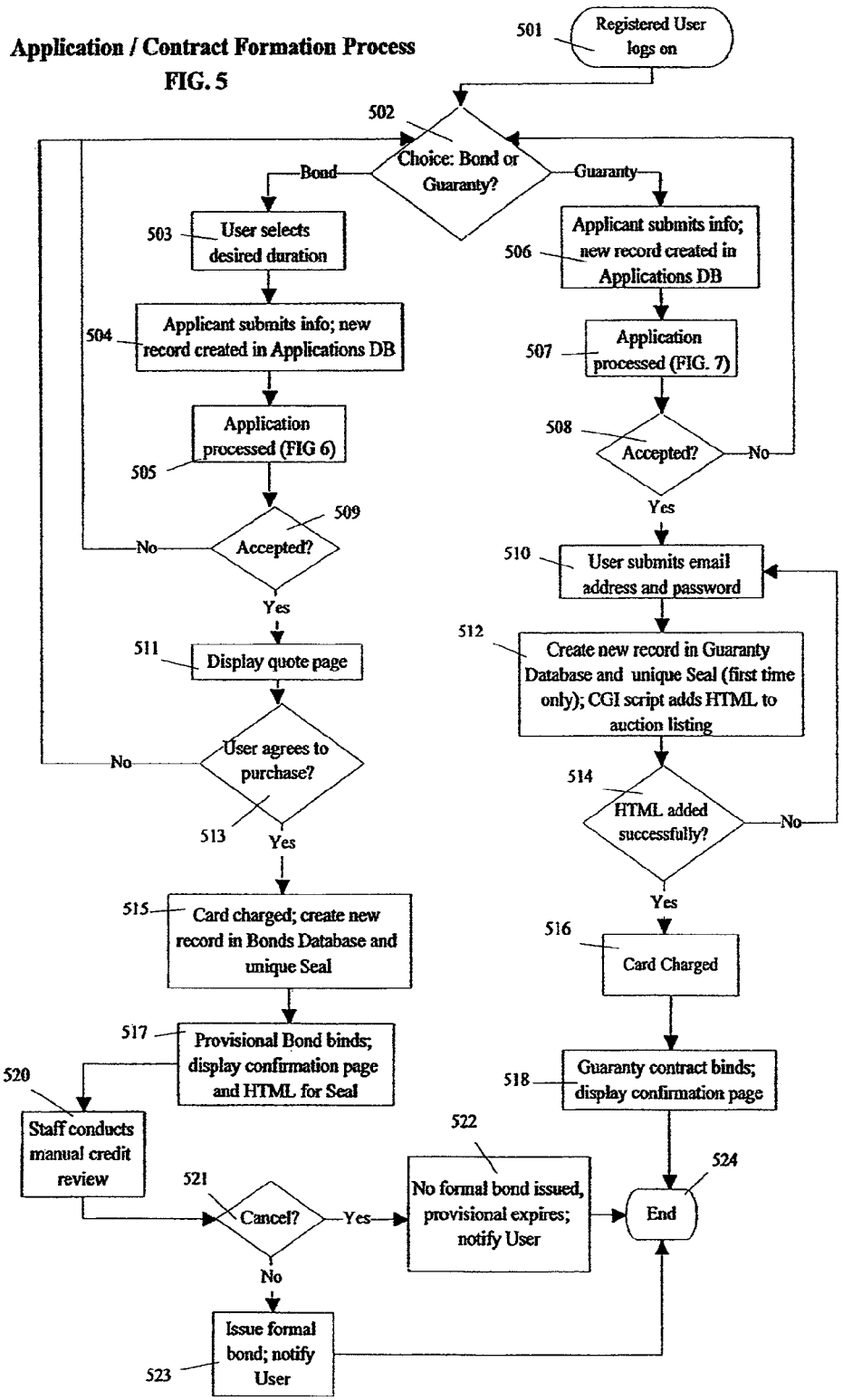

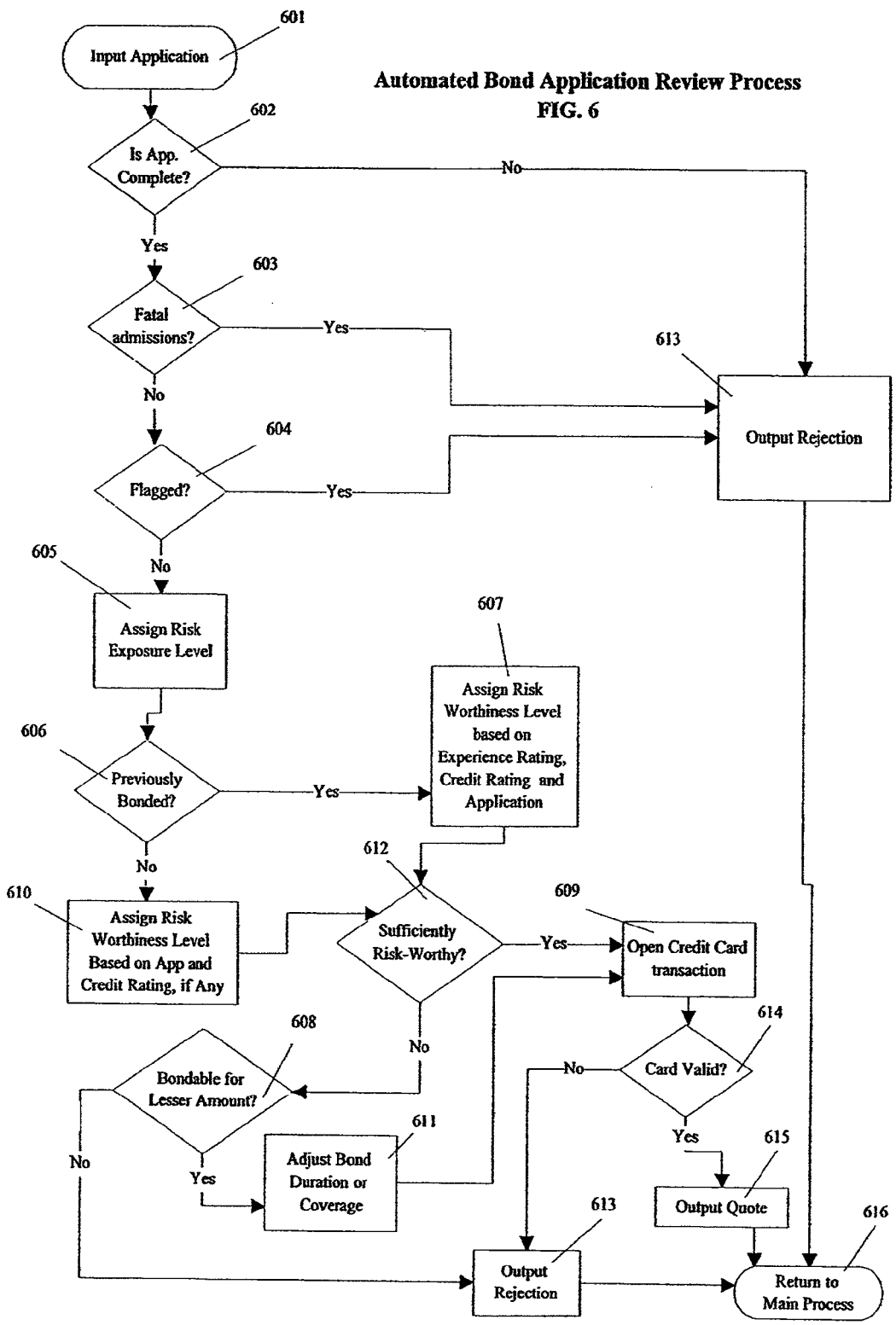

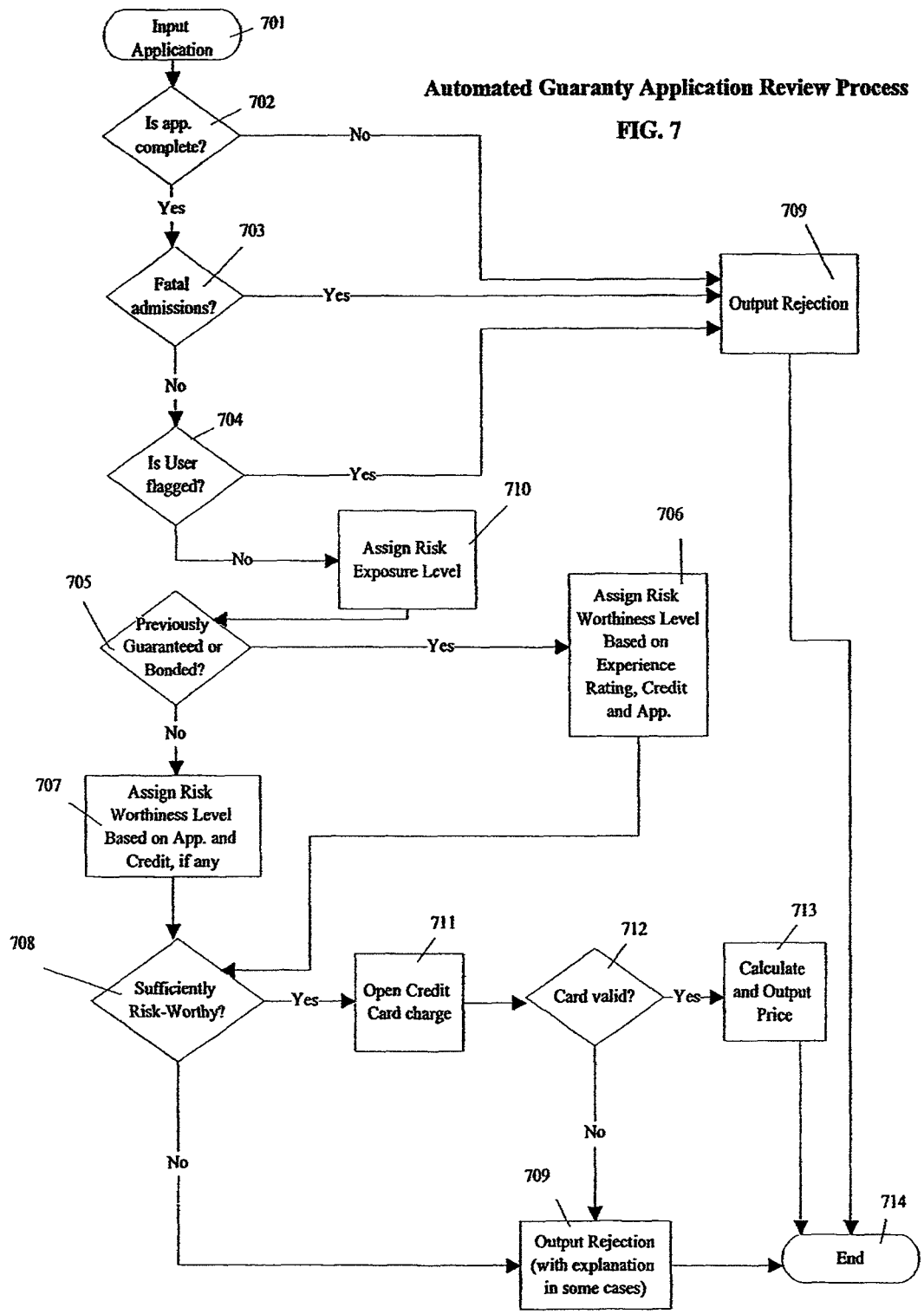

Flagging Process

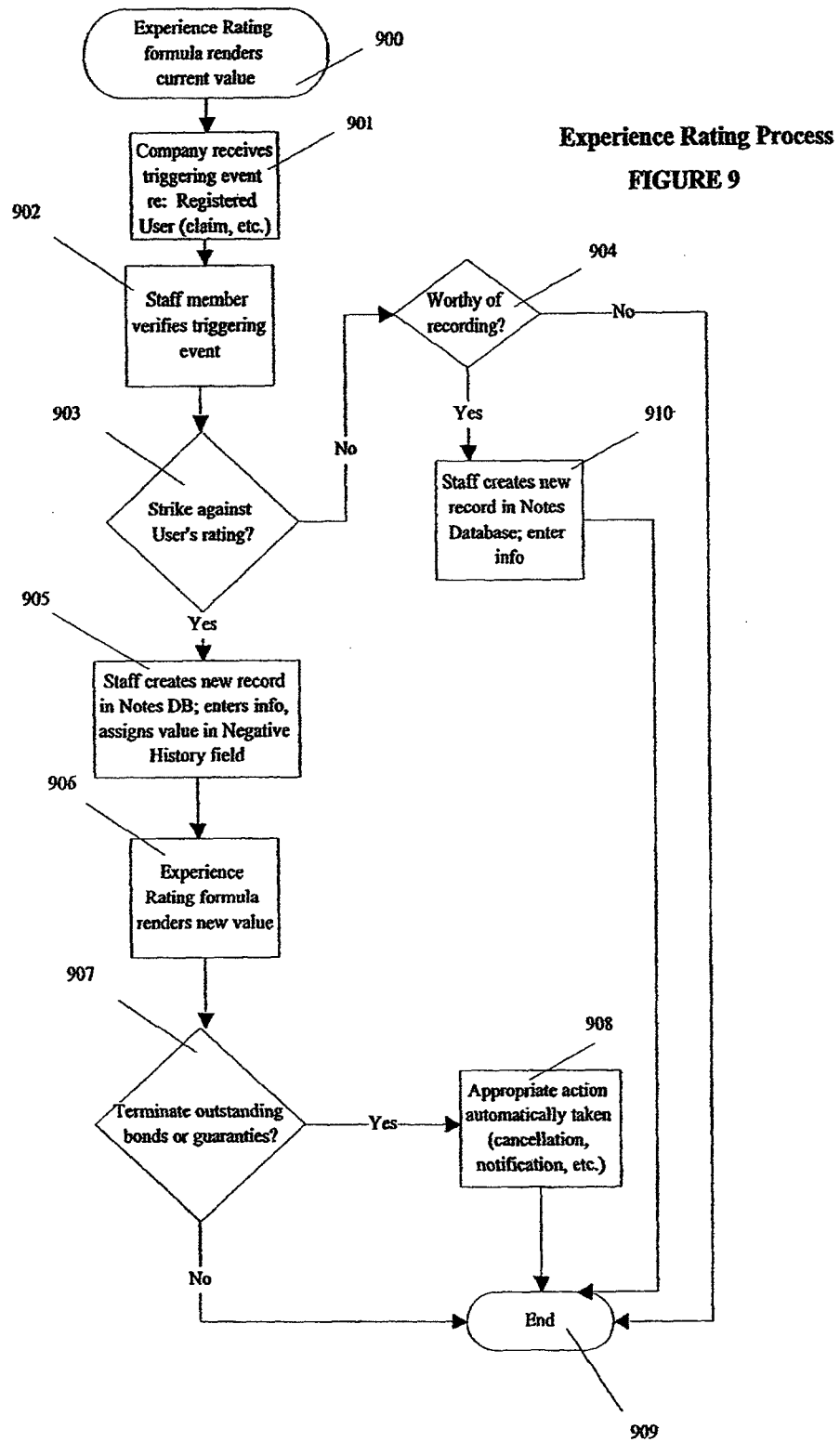

Sample GuarantyVerification
& Activation Page
FIGURE 10

Guaranty Verification and Activation Page
Welcome to [Company]

This page certifies that the following sale is guaranteed under the [Company] electronic guaranty program. Please verify that the page you are viewing is being hosted on the [Company] site, at www.company.com, and that the auction you wish to bid on is the auction identified below.

Auction Site: eBay

Auction #: 11987566

Seller: JohnDoe

Guaranty #: JH16j94

[Reproduction of Seal] 1001

[Banner Ad] 1002

Guaranty valid for bids placed on: Monday, 3/8/02

To activate coverage for your purchase under this guaranty, please enter the URL of the web page where the guaranty seal is being displayed by this seller:

Then provide your email address:

Upon submission of the requested information, you will receive a confirmation email which will include information which you must submit if you wish to file a claim under this guaranty. Therefore, be sure to keep the confirmation email as proof of your coverage activation.

SUBMIT

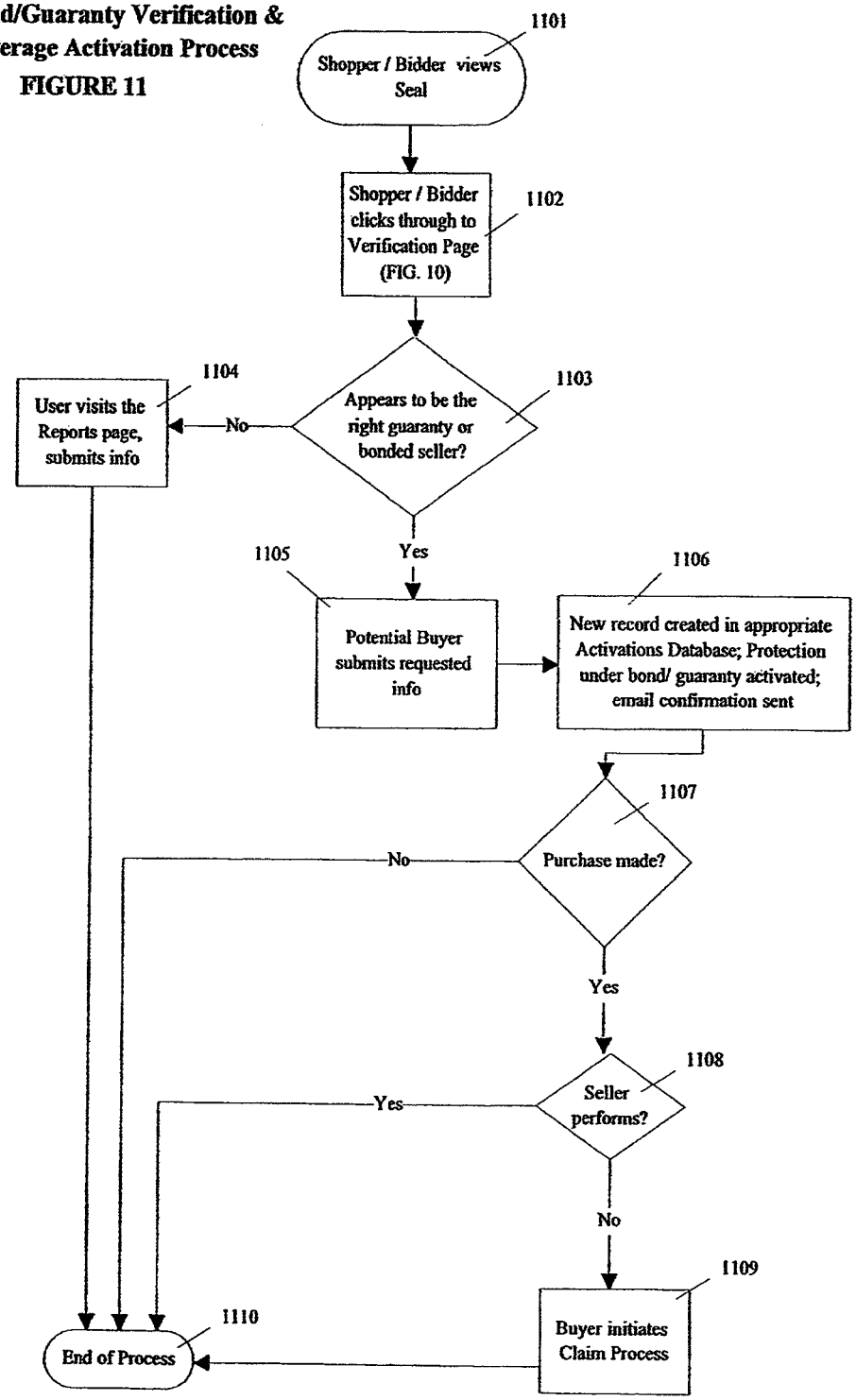

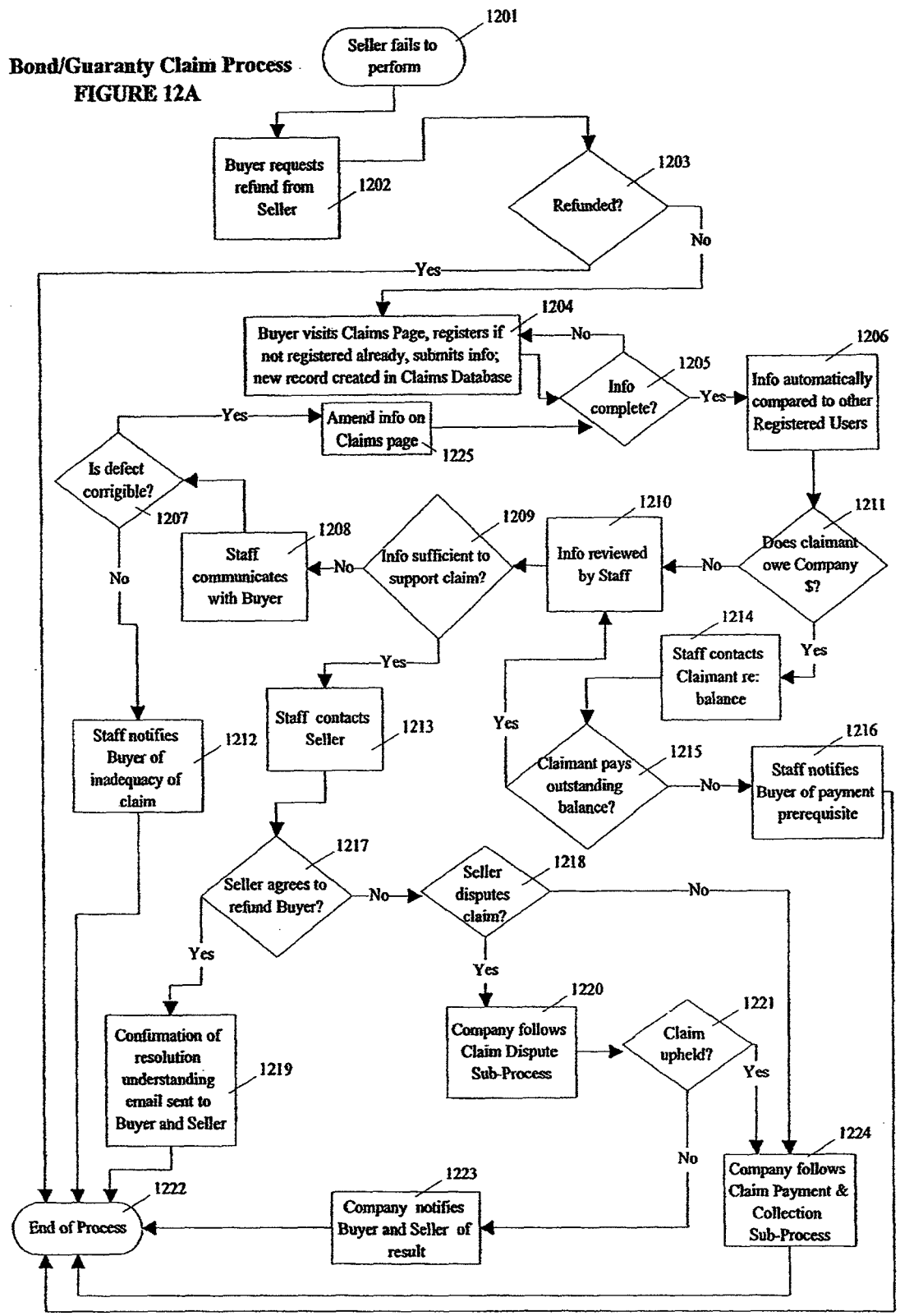

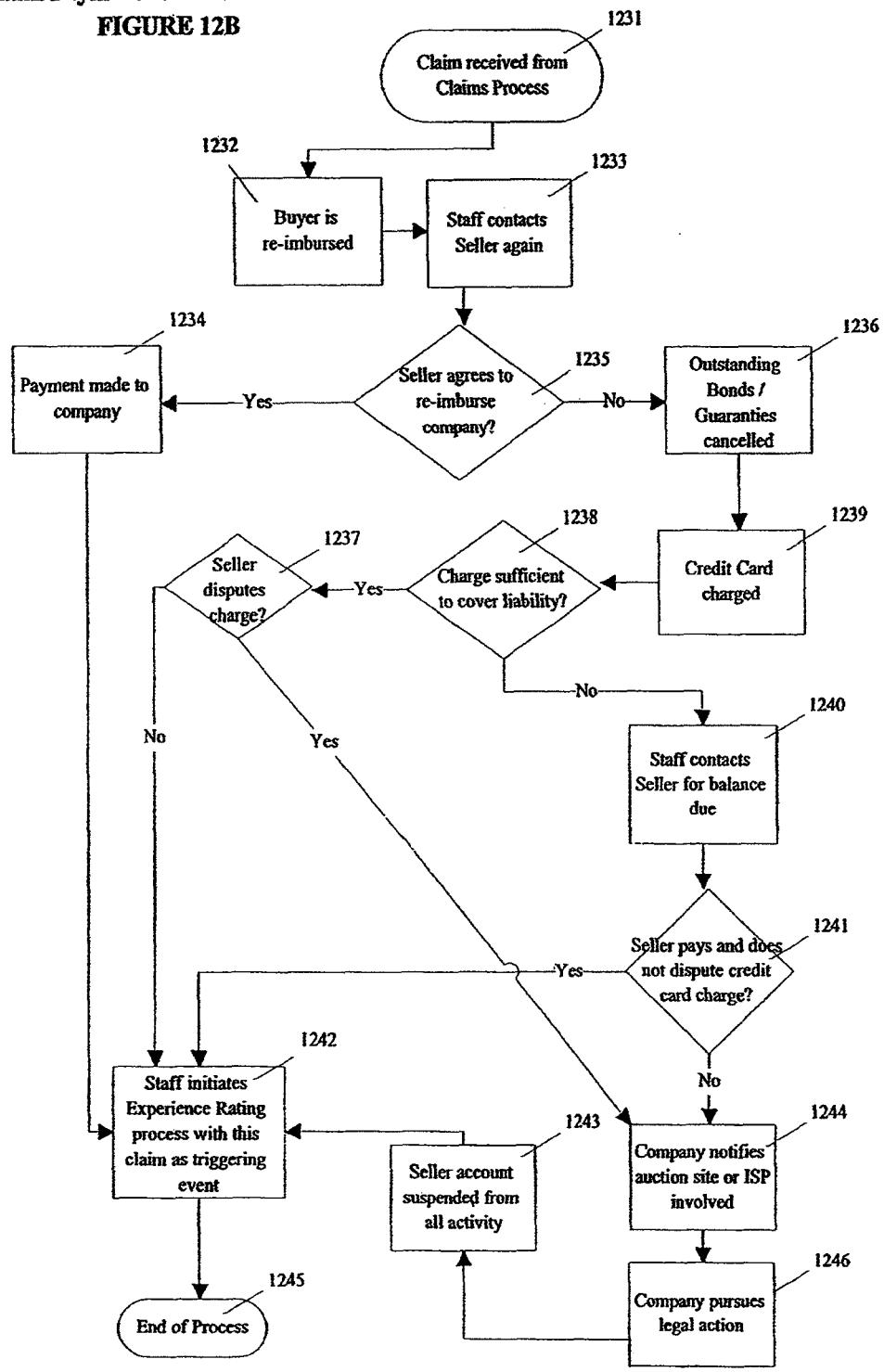

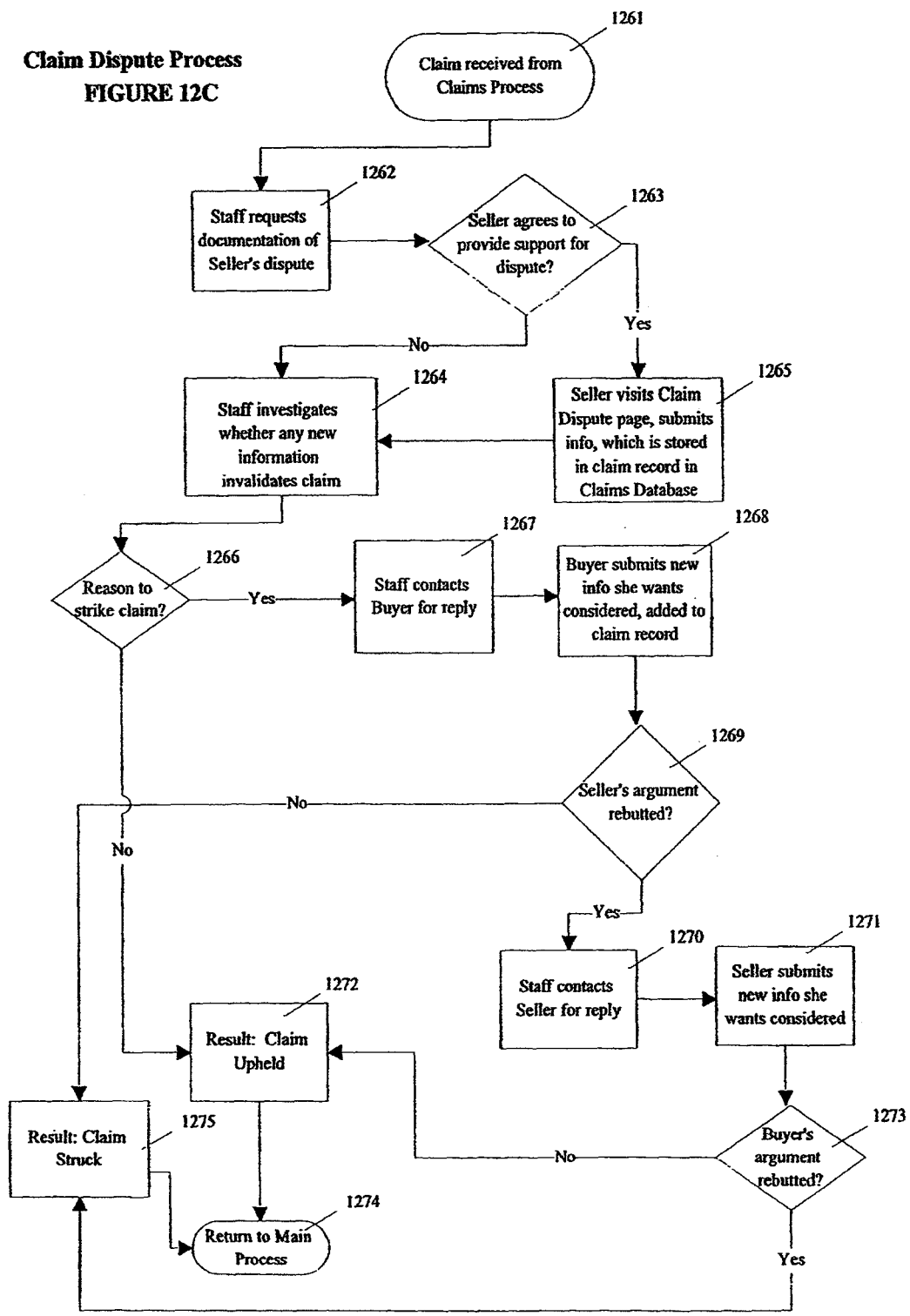

Structural Overview of Database Relationships

Revenue Models

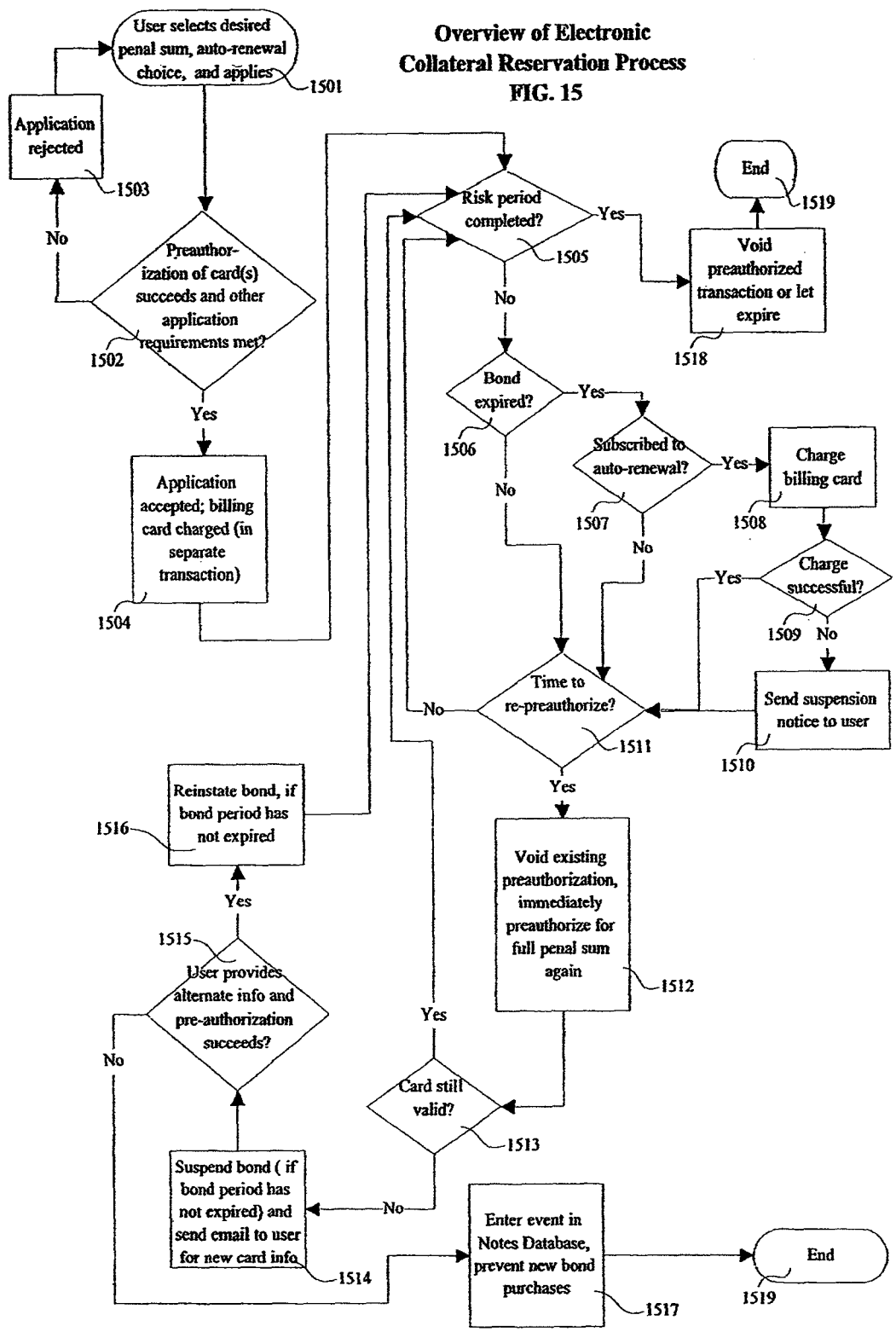

Example Timelines

Database Relationships between
Bond/Guaranty Company and
Third Party Auction Site Sample Excerpt from Third Party
Auction Site FIG. 18 Bond Margin Gauge Example

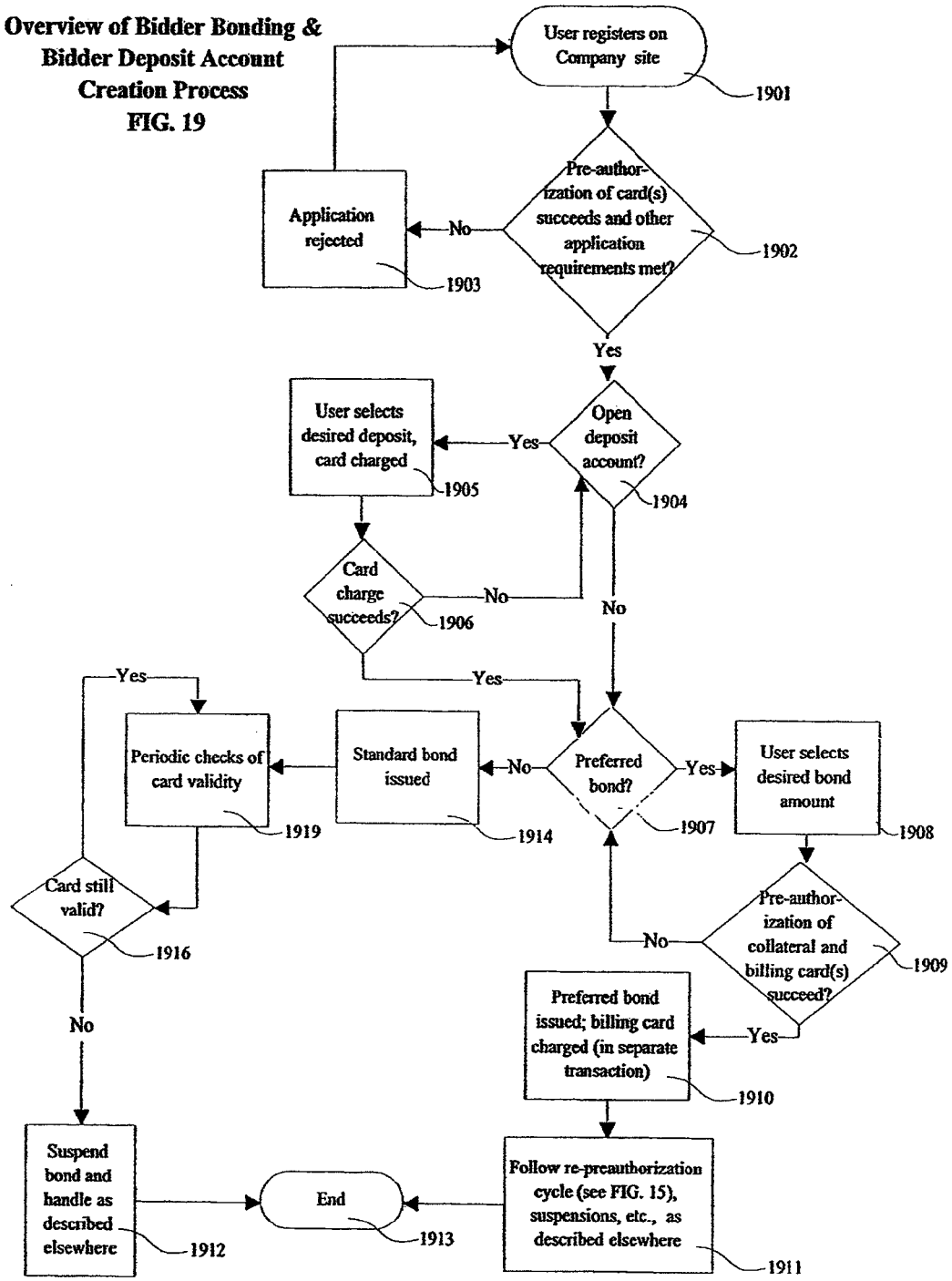

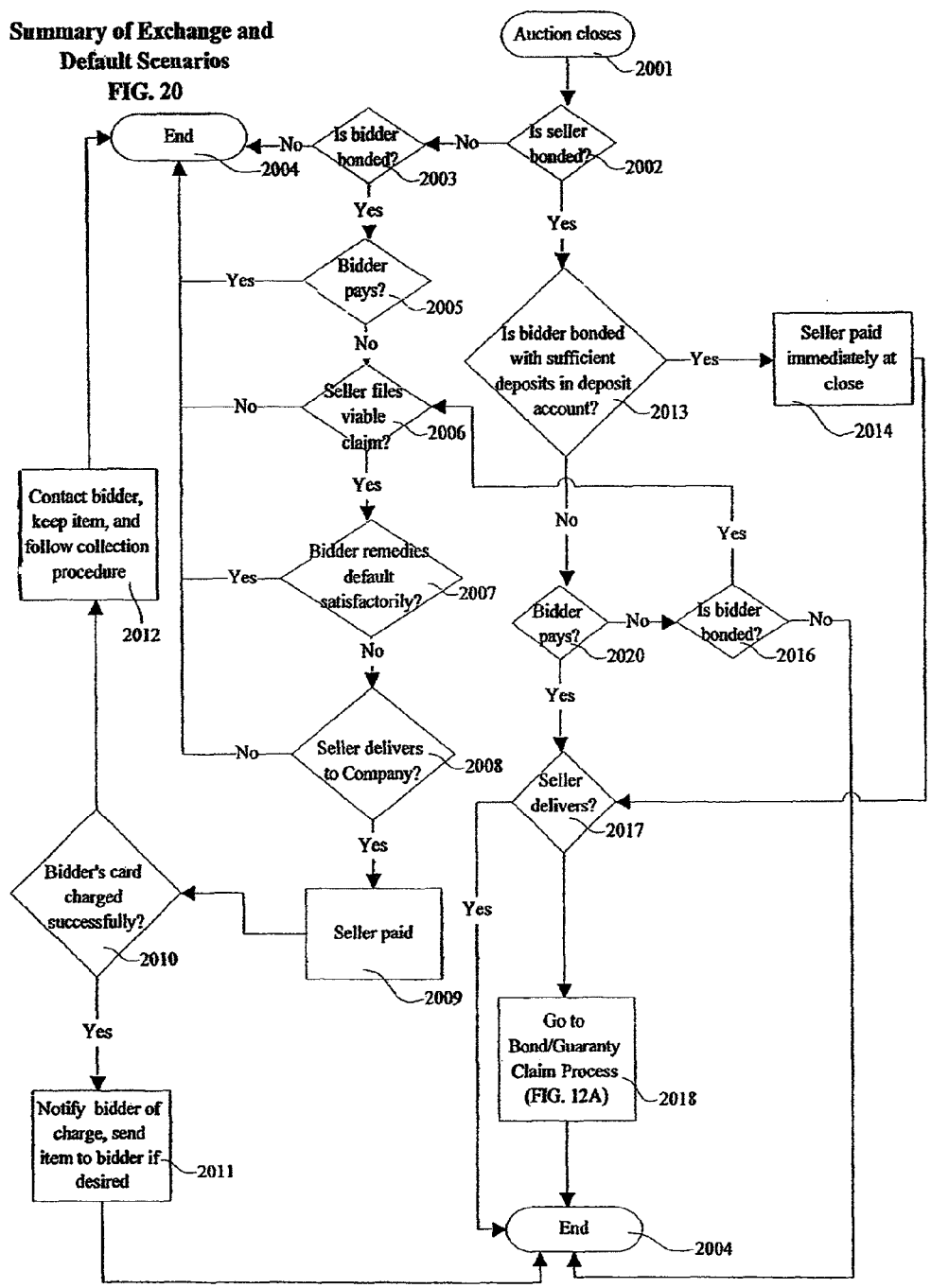

ELECTRONIC BOND AND GUARANTY PROCESS AND BUSINESS METHOD

CROSS-REFERENCE TO RELATED APPLICATIONS

This application is a continuation of application Ser. No. 11/692,712, filed Mar. 28, 2007, which is a divisional of application Ser. No. 09/848,639, filed May 3, 2001 and issued as U.S. Pat. No. 7,343,339 on Mar. 11, 2008, which claims priority to U.S. Provisional Application No. 60/201,483, filed May 3, 2000. The disclosures of application Ser. Nos. 09/848,639 and 11/692,712, are incorporated by reference herein in their entireties.

BACKGROUND OF THE INVENTION (1) Field of Invention

The present invention relates to the field of electronic commerce conducted in a client-server network environment, typically, the World Wide Web. Specifically, the invention relates to issuing performance bonds and guaranties over the Internet, as in cases where the party to be bonded is an Internet seller or bidder in an on-line auction environment.

(2) Background Art

The growth of electronic commerce has been accompanied by new risks to consumers. Enabling long-distance, anonymous transactions between individuals, user-to-user auction sites on the World Wide Web have given rise to severe problems of fraud and intellectual property piracy. These activities are also common on sites operated by fraudulent sellers themselves.

Various solutions have been attempted. Electronic escrow services, where a third party is injected between buyer and seller to verify that a quid pro quo exchange occurs, represent one proposed solution. But such services, such as escrow.com, have proven to be of limited value and have gained only limited market acceptance, mainly because escrow services (a) create unavoidable delays in effecting the exchange and (b) add significant costs to every transaction, even when the exchange goes well. Moreover, since escrow transactions must be arranged on an individual basis, the use of an on-line escrow approach is simply not feasible for high-volume sellers.

Another problem plaguing online auctions today is that of "deadbeat bidders," bidders who win an auction but never pay for the item purchased. Deadbeat bidders not only cost the seller a sale to other bidders who would have honored their contractual obligation to pay, but deadbeat bidders also cause sellers out-of-pocket expenses, since the auction company's commission typically must be paid by the seller whether or not she receives payment from the winning bidder. Escrow does not address the problem of deadbeat bidders, nor do electronic payment services, such as PayPal.

What is needed is a solution that effectively eliminates the risk of buying and selling over the Internet while adding little or no transactional cost in terms of time and money.

Performance bonding is a known means of legally shifting the risk of a given loss, a performance bond being a contractual agreement between the surety, the principal and the obligee whereby the surety agrees to protect the obligee if the principal defaults in performing the principal's contractual obligations. Black's Law Dictionary, $6^{th}$ Ed.

A guaranty is similar in purpose to a bond. A guaranty is a collateral agreement for performance of another's undertaking in which the guarantor agrees to satisfy the debt of another (the debtor), only if and when the debtor fails to repay (secondarily liable).

Collateral is property which is pledged as security for the satisfaction of a debt or performance of a principal obligation.

Letters of credit are a known means of facilitating transactions, whereby a bank or other institution agrees to honor demands for payment made in compliance with specified conditions.

A penal sum is a monetary sum agreed upon in a bond to be forfeited if the condition of the bond is not fulfilled. In this document, the term "coverage limit" may be used interchangeably with penal sum.

Automatic means of adding an electronic image and accompanying text to an Internet auction listing or other World Wide Web page is also known. For example, the company known as Honesty.com enables Internet auction sellers to visit the Honesty.com Web site, enter an auction site name, auction number, email address and password, and then have the Honesty.com logo and a unique "hit counter" added to the given auction listing automatically.

Means of searching the Internet and World Wide Web for infringing uses of digital images and text is also known, such as the automated search technology designed by iParadigms for plagiarism.org or the techniques known as "digital watermarking" or "fingerprinting."

Merchant card services enabling Visa or MasterCard transactions in real-time over the Internet are known.

SUMMARY OF THE INVENTION

The disclosed invention provides an automated, computer-implemented, network-based method by which Internet sellers can obtain either a performance bond or a guaranty in real time and immediately deploy a unique seal evidencing this contractual protection for buyers. The bond and the guaranty are contractual vehicles which serve to indemnify buyers against the risk of non-performance or non-conforming deliveries by sellers. Bonds for bidders, which assure sellers of payment when a bonded bidder wins an auction, are also disclosed.

In the preferred embodiment, the potential bond applicant first visits the Web site of the bond/guaranty company ("Company") and registers. The registered user then applies for either (1) a general suretyship performance bond which will offer security to purchasers in all of a seller's eligible Internet transactions up to the penal sum for all claims in aggregate or (2) a guaranty for a specific single Internet auction.

Upon submission, the seller's application is processed automatically through evaluation software with reference to various databases, performing automated analysis of the risk-worthiness of the user, the authenticity of the information submitted, and other checks. The seller then receives immediate approval or rejection of the application. If the application is accepted, the terms and price of the bond or guaranty are quoted to the applicant. The seller then pays by credit card, and a unique seal which identifies the newly formed bond or guaranty is displayed to the applicant. This seal can be automatically added to certain auction listings by CGI script, or the seller can manually add the HTML code referencing this logo to her HTML documents, whether these are hosted on her own site or a third party auction site.

In the preferred embodiment, potential buyers activate their coverage under the seller's bond or guaranty by "clicking through" a link in the seal to a page on the bonding/guaranty company site and submitting the information requested therein. Confirmation of coverage is then sent to the potential buyer by email. Alternately, coverage can be automatic for anyone who buys from a bonded seller, requiring no activation by the buyer.

If a seller defaults, the buyer submits a claim, including confirmation of coverage activation, if required. The Company evaluates the claim and reimburses the buyer if warranted. Thereafter, the Company takes appropriate action for reimbursement from the seller, such as charging the seller's credit card.

In this way, the present invention offers a more effective, less expensive, infinitely scalable and virtually "invisible" solution to the problem of making the Internet a secure marketplace.

Various security measures for reducing piracy of the seal or otherwise misrepresenting a seller's status are disclosed. Various revenue models are also disclosed which allow shifting of cost to the most efficient payer. A seal which includes a "bond margin" counter is also disclosed.

In one alternative embodiment, the Company's risk is significantly reduced through a process by which the bond applicant's credit card used for sequential preauthorizations that serve to reserve a portion of the funds available in the given account as collateral. Other forms of collateral, such as an irrevocable letter of credit, can be substituted by special arrangement with the Company.

In another alternative embodiment, the Company and a third party auction site operator work collaboratively through real-time data sharing so as to enable the third party auction site operator to serve the Company's seal in portions of the auction site under the exclusive control of the auction site operator.

Another significant alternative embodiment provides for the bonding of bidders as well as sellers. In this embodiment, bidders can open a deposit account with the Company that allows instantaneous payment of a bonded seller at the close of an auction.

BRIEF DESCRIPTION OF THE DRAWINGS

FIG. 2B presents a flow chart depicting a high level, general overview of the steps involved in guaranty contract formation and claims resolution under the present invention.

FIG. 4A depicts a flow chart of a typical site registration process.

FIG. 4B depicts a uniquely numbered identifying Seal which signifies that the given Internet seller is bonded; this Seal is to be displayed in HTML documents wherein sale is offered.

FIG. 4C depicts a Seal signifying that the given Internet auction is guaranteed.

FIG. 5 presents a high level flow chart documenting the process by which an application is submitted, evaluated, and processed and the resulting bond or guaranty contract, if any, formed.

FIG. 6 depicts a flow chart documenting the bond application evaluation subprocess.

FIG. 7 depicts a flow chart documenting the guaranty application evaluation subprocess.

FIG. 9 depicts a flow chart documenting the process by which a registered user's Experience Rating is assigned.

FIG. 10 depicts an example Verification/Activation Page, to which potential purchasers or bidders "click-through" in order to verify that the given seller is bonded or the given auction guaranteed and to activate their right to protection under the given bond or guaranty.

FIG. 11 depicts a flow chart documenting the process by which a potential bidder activates her coverage under a bond or guaranty.

FIG. 12A depicts a flow chart detailing the process by which a claim is made and resolved.

FIG. 12B depicts a flow chart detailing the claims payment and collection process.

FIG. 12C depicts a flow chart detailing the claim dispute resolution process.

FIG. 15 depicts a flow chart detailing the process by which a bond that makes use of preauthorized charges to a credit card as collateral is put into effect and maintained.

FIG. 18 depicts a sequence of five moments in time demonstrating the effects of different events on the margin of bond coverage over and above potential claims thereon.

FIG. 19 depicts a flowchart documenting the process by which a bidder is bonded and a bidder deposit account is created.

FIG. 20 depicts a flowchart that ties together previous discussion by illustrating the many different results that can occur after the closing of an auction in the context of potential bonding of both sellers and bidders.

DETAILED DESCRIPTION OF THE INVENTION WITH REFERENCE TO THE DRAWINGS

So as to highlight the key components of the present invention, the following detailed description uses the example of an Internet auction as a paradigmatic case of electronic commerce. It is known to one ordinarily skilled in the art that Internet auctions are but a single form of electronic commerce and that the present invention applies to other forms.

It is also known that Internet sellers represent but a single class of bond/guaranty purchasers and that the present invention can be readily applied to serve any number of "off-line" markets through the collateral reservation process and others described below.

It is also known to a person of ordinary skill in the art that the Internet represents a client-server environment. Thus, when an Internet buyer or seller is mentioned in this document, it is understood that, typically, she is accessing an HTML document hosted on a server by sending an HTTP request from her client computer, with Web browser software properly installed, to the server computer through the Internet. HTTP server, firewall, data storage and processor hardware configurations are known, and server software is assumed to be properly installed on this hardware.

All steps in the processes described with respect to the present invention are executed in software installed on the Company's hardware unless it is expressly stated that the step is taken by a human: staff member, applicant, or other person. The software to execute these steps is known to one of ordinary skill in the art. Several databases, each of which contain several records with at least one don field per record, are depicted. Some data fields serve as repositories for information as it is input by a human; other fields contain values which are assigned by a formula which references other fields as factors. As is plain to one skilled in the art, the databases are relational, and most relationships are many-to-many.

The present invention contemplates a Web site (the "Site") which is operated by a bonding/guaranty company (the "Company"), and, in certain embodiments, a Web site operated by an auction company ("Auctioneer").

Figure 1:
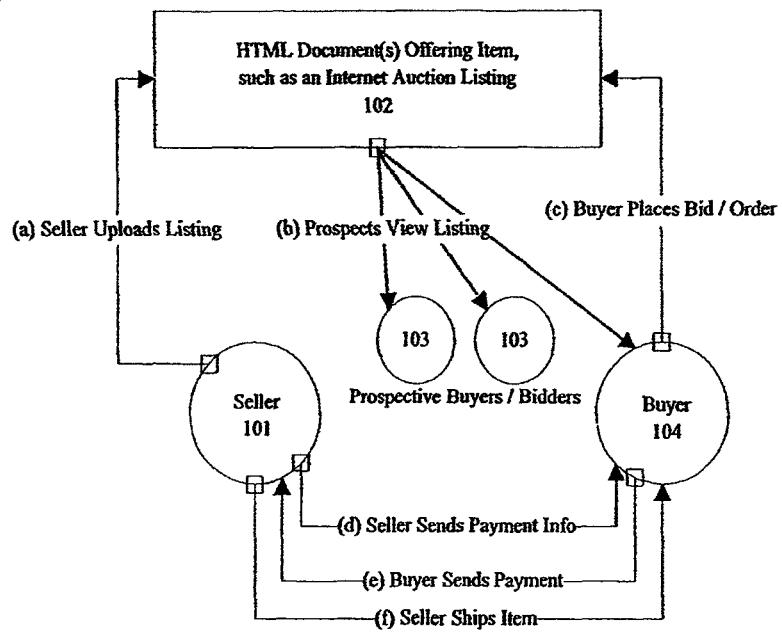
FIG. 1 depicts the basic steps by which an exchange between an Internet seller and buyer is transacted.

By way of introduction, an example of the process by which a typical user-to-user exchange occurs via Internet auction is depicted in FIG. 1. The Seller 101 creates and uploads to the auction site's server an HTML auction listing 102 which is then viewed by potential bidders 103. The eventual high bidder 104 places her bid through the Web site where the auction listing appears 102. At the close of the auction, the Seller 101 sends an email to the Buyer 104 detailing her payment address. Buyer 104 then sends payment to Seller 101, also conveying her shipping address. Buyer 101 then ships item.

Figure 2A:
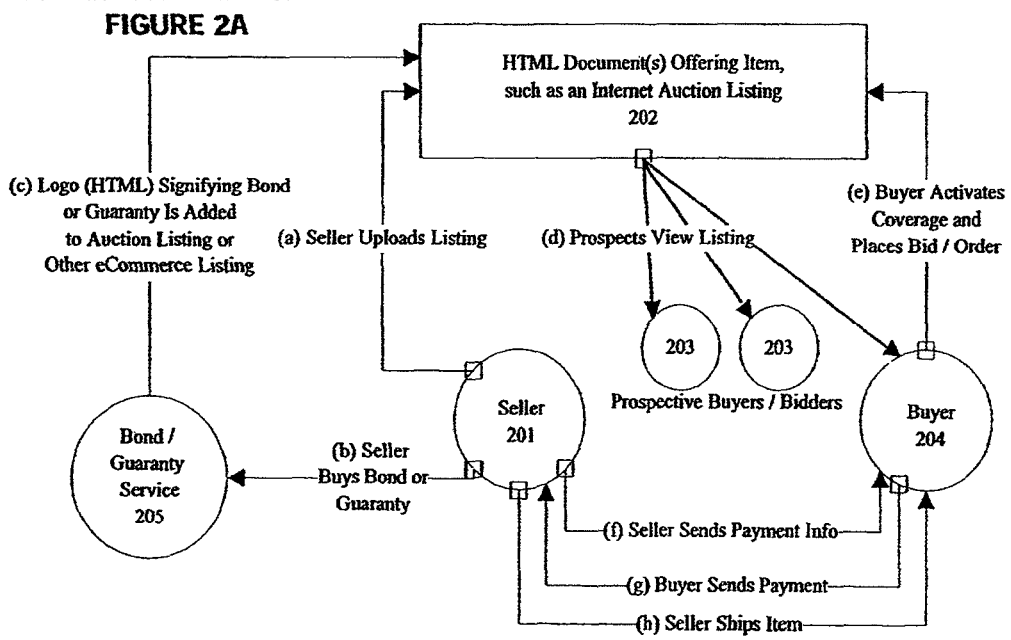
FIG. 2A depicts an exchange between an Internet seller and buyer wherein the present invention is used to provide a bond or guaranty.

FIG. 2A depicts a similar user-to-user exchange. This time, however, the Seller 201 purchases a guaranty or bond from the Company 205 per the present invention before uploading the auction listing 202. The transaction is otherwise similar to that depicted in FIG. 1, except that, when bidding on the auction, the Buyer 204 also activates her right to protection under the bond or guaranty by clicking on the Seal 410 or 420 which appears in bonded or guaranteed auction listings.

FIG. 2B depicts a high-level flow chart of the guaranty process, which is essentially similar to that used in bonding. Each of the key steps therein is covered in greater detail in subsequent discussion.

Figure 3:
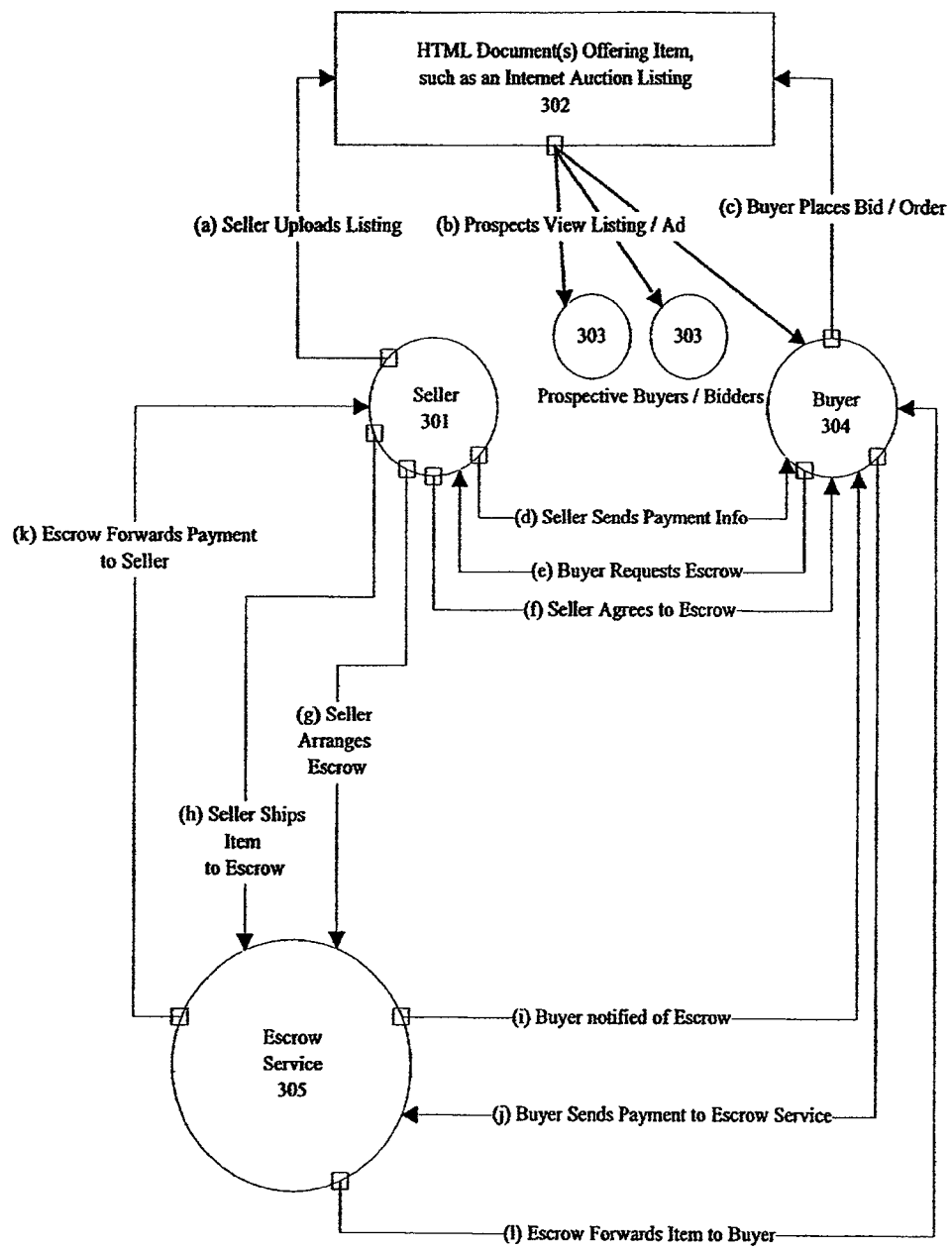
FIG. 3, included for comparison, depicts the basic steps by which an exchange between an Internet seller and buyer is transacted through an escrow service.

Included for comparison, FIG. 3 demonstrates that using an escrow service adds several more steps to the transaction than the present invention requires.

FIG. 4A depicts the basic steps of registration with the Company Site. For reference in later discussion, FIGS. 4B and 4C depict the Seal which plays a key role in the present invention. This Seal (410 for bonds and 420 for guaranties) includes an image (411, 421), preferably a .gif or .jpg image, and text (412, 422) which are applied to a seller's auction listing or other HTML document to notify the public of the bond or guaranty. The means by which these Seals (410 and 420) are created and added to HTML documents so as to be viewable by the public are discussed below. When the hyperlink in the text (412, 422) is clicked, a new browser window is spawned, and the Bond Activation/Verification Page (FIG. 10) discussed below is displayed therein. A second hyperlink ("Contact Us") appears in this text (412, 422) and links to a form on the Site, the Reports Page, which enables submission of a report of suspicious activity.

FIG. 5 illustrates a flow diagram documenting the process by which a bond or guaranty is applied for, evaluated, legally bound and deployed. Sub-processes are broken out in more detail in later figures.

Having registered with the Site, the registered user logs in 501, views information about bonds and guaranties, and selects whether she wants to apply for a bond or guaranty 502. If the bond choice is selected, the User selects the desired bond duration 503 and penal sum from a menu and submits information requested in a variety of data fields 504. The requested information includes fields such as:

a1. Principal type of merchandise or services sold, which is selected from a menu including computer software, hardware, clothing, music and video media, and other merchandise categories
a2. Percentage of sales derived from the category chosen in a1
a3. Secondary type of merchandise (same menu)
a4. Percentage of sales derived from the category chosen in a3
b. Expected total revenue from Internet sales
b2. Last year's total revenue from Internet sales
c. Average # of transactions
d. User's Social Security #
e. User's bank 1
f. Bank account number at bank 1
g. User's bank 2
h. Bank account number at bank 2
i. User's employer
j. Employer's address
k. Employer's city
l. Employer's state
m. Employer's postal code
n. Employer's country
o. Employer's phone
p. Employer's fax
q. Employer's email
r. Employer's web site
s. Credit Reference 1 (credit card, other loan institution)
t. Account number for Reference 1
u. Credit Ref 2
v. Account number for Credit Ref 2
w. Annual income
x. All email accounts used by seller (repeating field)
y. All web sites (by URL) used by seller (auction sites, personal sites, etc.) (repeating field)
z. Credit card to be charged—type (MC/Visa/AmEx)
aa. Card number
ab. Card exp. date
ac. Name on card
ad. Billing zip
ae. Answers to various questions such as "Do you sell homemade copies of commercial software?" are also requested
af. Previous bond number, if any
ag. Password for the previous bond, if any Typically, the more credit references and dependable identifying information the user provides, the more likely she is to be approved for a bond and/or the less expensive that bond will be, as discussed below in reference to FIG. 6, since such information helps to reduce the Company's risk. If the seller wishes to take advantage of instant payment from bonded bidders' deposit accounts per the process described in FIG. 19, routing numbers for wire transfers must also be provided.

When the application is submitted, a new record is created 504 in the Applications Database. The application is evaluated 505 per the Automated Bond Application Review Process depicted in FIG. 6. This sub-process returns a result 509: in the case of rejection, the user's browser is directed back to the selection page 502. Alternately, (arrow not shown) the user can be sent back to the application page 504 to correct noted defects in the application. In the case of approval, the acceptance page is displayed, including a quoted price for the requested bond 511. If the user agrees to purchase at the quoted price 513, the charge to her credit card charge is finalized 515, a new record is created 515 in the Bonds Database 1301, (FIG. 13) a unique Seal 410 is generated automatically and stored on the Site server 517, and the Provisional Bond Contract becomes legally binding 517. The HTML code for the Bond Seal 410 is displayed 517 to the applicant so that she can copy this code and use it in her offers for sale. The HTML referencing the seller's Seal can also be retrieved later by the seller visiting her account page on the Site.

Alternately, (not depicted graphically) the Company can require that the bonded seller first submit the URL of each page wherein the Seal will be displayed before the HTML, code which renders the Seal is made available. Requiring URL submission of each Web page wherein the Seal is to be displayed may enable greater accuracy in Company policing for pirated Seals.

The Provisional Bond Contract is only valid for a specified period of time and is not renewable. It serves primarily to enable instant binding of a bond, a significant benefit to sellers, while not exposing Company to extended risk. After the Provisional Bond is bound 517, a manual review 520 is conducted by Company staff of the bond application, who pull credit reports and review submitted information. If the seller appears credit-worthy, the Staff authorizes issuance of a Formal Bond 523 by entering the result in the bond application and finalizing the review process. The Formal bond then issues prior to the expiration of the Provisional Bond, thereby rendering the latter null and void. The bonded seller is automatically notified of the issuance of the Formal Bond 523 but is not required to take any further action, since supplanting the Provisional Bond with the contractual rights and obligations of the Formal Bond does not change the appearance of the Bond Seal 410. If Staff decides applicant does not merit the Company's undertaking the obligations of Formal Bond, Staff enters the result in the appropriate field in the bond application record and finalizes the review process. Thereafter, the Provisional Bond expires, and the seller is automatically notified 522. In this case, the Seal image 411, which resides on the Company's servers, will be automatically replaced with a new image which indicates that the Provisional Bond has expired.

Returning to the top of FIG. 5, if the registered User chooses to apply for a guaranty, the first time she purchases a guaranty, she will be required to enter much of the same information as is required in the bond application 506. Thereafter, subsequent guaranty applications by the same account holder are much shorter so as to be more convenient. The abbreviated guaranty application requests the following information:

a. Auction site where item to be guaranteed is listed
b. Auction identification number
c. Seller's email address used in that auction listing (used to access the listing)
d. Type of merchandise being sold (select from menu)
e. Guaranty amount or estimated closing value
f. Check box answers to questions such as: "Is all merchandise authentic and authorized for sale?"
g. If credit card is already on file, then the User simply authorizes the charge; if credit card is not on file, then User provides credit card information.

While the above fields pertain to a specific auction, the present invention also contemplates a single submission form containing multiple repetitions of the above fields so that several auction guaranty applications can be submitted at one time, which reduces unnecessary re-entering of data that does not change from auction to auction, such as a credit card number, if such is not already stored.

Upon submission, the application is processed 507 according to the Automated Guaranty Application Review Process detailed in FIG. 7. If the application is approved, then the User is prompted to provide her password for the given auction account 510 and email address if the one being used in the given auction is different from the one already provided. This password is never stored anywhere by the Company and therefore must be entered each time an auction is to be guaranteed. This password is used to gain editing access to the specified auction listing so that the Company's CGI script technology can automatically append the HTML which produces the Seal 420 to the existing HTML of the specified auction listing. If the User is not accepted, her browser is redirected to the begin page 502 or, alternately, back to the Guaranty Application page 506 (arrow not shown) to correct any defects in her application.

Once the password is submitted 510, which also signifies the applicant's authorization to charge her credit card, a new record is created 512 in the Guaranty Database, a new, unique Guaranty Seal image 421 is created and stored 512 on the Company server, and the CGI script which appends the Seal HTML to the given auction listing is run 512. If the CGI script successfully adds the Guaranty Seal HTML to the specified auction listing, the credit card transaction is finalized 516, the Guaranty Contract is consummated 518, and the confirmation page is displayed 518 in the applicant's browser, informing her that the Guaranty is active, and the Seal added to the specified auction. If the CGI script fails, the User is re-prompted for her email address and password 510.

FIG. 6 depicts a flow chart documenting the steps of the Automated Bond Application Review Process. Information in newly submitted applications is input into this software process 601, and a result—acceptance with price quote 615 or rejection 613, with or without reasons—is output. In evaluating the application, the software will produce a rejection result 613 if any significant fields are left blank 602 or if any admissions 603 are made in the application that indicate that the given seller is an intellectual property pirate or other illegitimate seller. Next, the contact information provided in the application is checked against the information contained in all the corresponding fields in all records in the Flagged Individuals Database 1303. If a high certainty correlation exists between the contact information provided in the application and that in a Flagged Individual record, such as an identical email address, then the applicant is consider flagged 604 and is rejected 613.

If the application survives the initial cuts, a Risk Exposure Level is assigned 605. This number is the product of a formula which includes several factors, such as: the coverage value being requested (higher revenue sellers will yield greater risk exposure), the types of merchandise, and the number and verifiability of credit references.

Data is checked to determine whether the applicant has previously been bonded by the Company 606. If so, she will already have an Experience Rating, which is determined per the Experience Rating Process depicted in FIG. 9 below. If the applicant has applied in the past, a manual credit review may have already been conducted on that individual and an in-house Credit Rating assigned to her. The Experience Rating, if any, and Credit Rating are factored in with the information contained in the application itself to assign a Risk Worthiness Level 607 or 610 to each application. The Risk Worthiness Level is compared to the Risk Exposure Level 612, and the application is either accepted or denied. If accepted, a credit card preauthorization is performed 609. Provided that the credit card is valid 614, a price quote for the bond is output 615, the sub-process depicted in FIG. 6 ends, and the main process depicted in FIG. 5 resumes 616. If the application is denied, comparison is made between the applicant's Risk Worthiness Level and that required for shorter potential bond durations and lower penal sums to see whether the given applicant may qualify for a less risky bond 608. If so, then a new bond duration and rate is selected 611 for use in the price quote. If the applicant is not sufficiently risk-worthy even for a reduced risk bond, then rejection 613 is output 616.

FIG. 7 depicts the Automated Guaranty Application Review Process, which is similar to the bond evaluation sub-process. One difference is that the result is strictly binary; there is no option of reducing the amount of coverage in order to guaranty a non-guaranteeable auction. Also, note that in the preferred embodiment, the prices for guaranties are fixed according to the value of the item; thus, a quote is not necessary, simply the outputting of acceptance and confirmation of price. As an alternative embodiment, prices can be set to vary according to the Risk Worthiness Level of the applicant, in which case a quote would be necessary.

Figure 8:
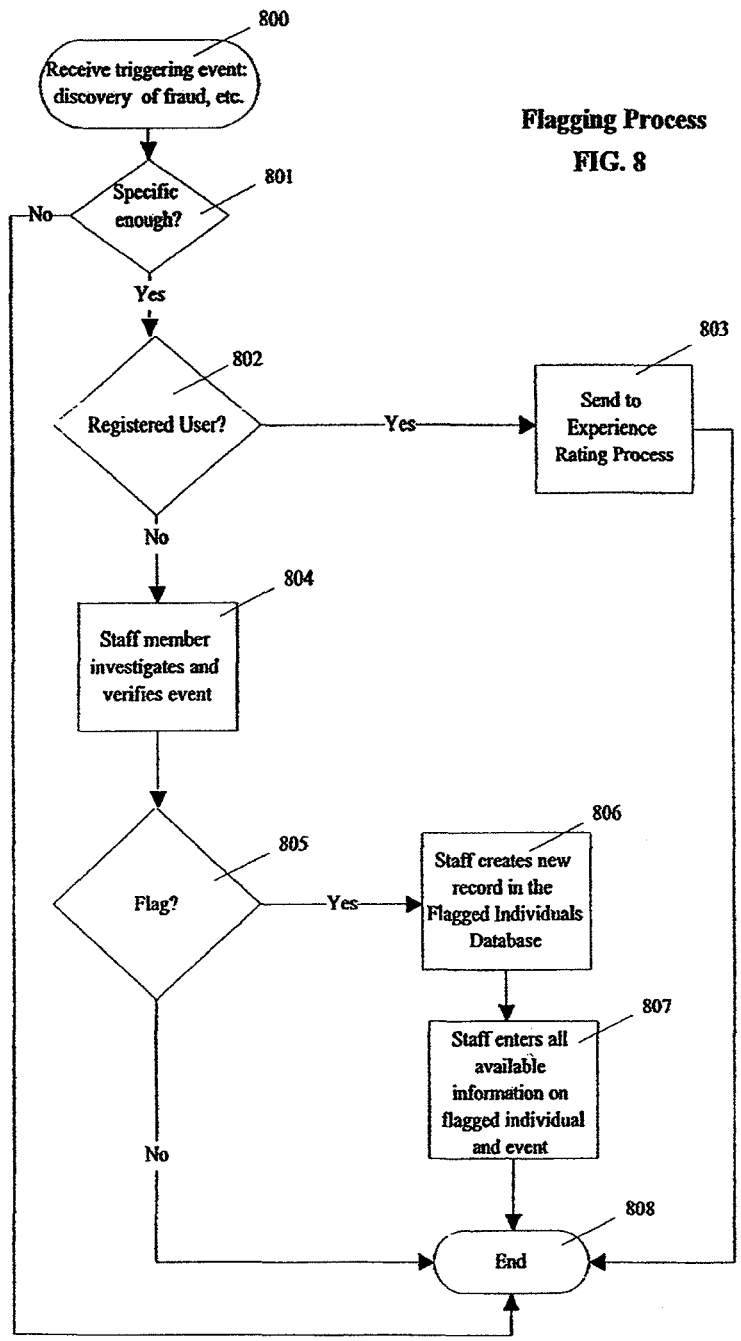
FIG. 8 depicts a flow chart documenting the process of "flagging" an individual.

FIG. 8 illustrates another supporting process, that by which individuals are flagged. The Flagging Process starts with the discovery of information about a given person 800, through some means other than the filing of a claim, which might be of such a discrediting nature that, if true, the Company would not want to issue bonds or guaranties to that person. Receipt of such information is a "triggering event" 801. For instance, a triggering event could be a notice to the Company by the police reporting an intellectual property pirate.

In a particular alternative embodiment (not depicted graphically), the Company performs intellectual property monitoring searches on the Internet. Each discovery of an instance of piracy would be a triggering event so that searches would, over time, create a database of known pirates, a valuable tool in reducing Company risk exposure.

Alter the triggering event, the information received is examined manually by staff to determine whether the event can be directly attributed to a specific individual 801. If not, then the triggering event is discarded 808. If so, then the contact information identifying that individual, which may be as little as an email address or may be a full compliment of contact information with the individual's name, is input by staff for automatic searching against the records in the Registered User Database to see whether the person may be a registered user 802. If the individual involved does indeed appear to be a registered user, then the Experience Rating process 803 depicted in FIG. 10 is followed, and the Flagging Process ends 808.

If the event apparently does not involve a registered user, then a staff member investigates 804 to determine whether the damaging information is credible, whether the contact information associated with the event is correct (contact info need not be complete, just accurate), and whether the magnitude of the event is such that it warrants flagging of this individual 805. If flagging is appropriate, then a new record is created 806 in the Flagged Individuals Database 1303, and all information available on the individual and event are entered in the appropriate fields 807. If flagging is not warranted, then the process ends 808, and the information is discarded.

The Experience Rating Process, depicted in flow chart form in FIG. 9, pertains to a triggering event 901 as well. In this case, the triggering event is likely to be a claim against a bond or guaranty, but it may also be input from the Flagging Process (FIG. 8), into which all reports which are not first presented as pertaining to a Registered User are directed.

Prior to Company's receipt of a triggering event or claim, a Registered User record contains a certain value in the "Experience Rating" field which is the product of a formula 900. This value grows automatically as the given Registered User builds up "Positive History" by purchasing more and more guaranties or bonds which do not result in claims. Specifically, the Experience Rating formula references each Bond Database 1301 record and Guaranty Database 1307 record related to the given Registered User Database 1308 record so that the value rendered by the formula automatically reflects the number of that user's bonds and guaranties which have resulted in no claims.

Upon the receipt of a triggering event 901, the Company first investigates and verifies the event 902 through researching the credibility of the report, if this has not already been done (in the case of a claim having already been paid, verification at this stage is unnecessary).

Company Staff then evaluates whether the event is credible and damaging enough to merit a strike against the user's Experience Rating 903. If not, then Staff decides whether to record the event at all 904, either making an entry in the Notes Database 910 or ending the process 909. If the event is sufficiently credible and damaging, the Staff creates 905 a new record in the Notes Database 1311, enters all information 905 pertaining to the event, and then assigns a negative value to the event and enters 905 this value in the "Negative History" field of the given Notes Database record 1311, which field is referenced in the formula which determines the Registered User's Experience Rating value, thus resulting in a new Experience Rating 906. If the new Experience Rating value falls below a predetermined limit as a result of the new Negative History 907, then all outstanding bonds and guaranties are automatically cancelled, the Seals expired, and the given user is notified 908.

FIG. 10 depicts an example Verification/Activation Page, which serves a role in the Bond/Guaranty Verification & Coverage Activation process depicted in FIG. 11. The example depicts the Verification/Activation Page for a guaranty, but the page for a bond is similar.

In verifying that a given seller is bonded or a sale guaranteed, the buyer first views the Seal (410 or 420) being displayed by the seller 1101 and then clicks through 1102 to the verification page (FIG. 10) by clicking on the link included in the text (412 or 422) portion of the Seal (410 or 420). Viewing the verification/activation page (FIG. 10), the potential buyer evaluates whether this seller is who she claims to be or that the auction guarantee matches the auction which the potential buyer would like to bid upon and for which coverage is to be activated 1103. If there is not a match, the potential buyer may file a report of potential misappropriation of the Seal 1104. If the there is a match, the potential buyer submits 1105 the information requested in the Verification/Activation Page (see FIG. 10), which causes a new record 1106 to be created in the Bond Activations 1302 or Guaranty Activations 1312 Database. The buyer then receives an email confirming activation of coverage under the given bond or guaranty and containing a confirmation code that must be supplied in order to file a claim 1106. Alternately, an encrypted attachment (not depicted graphically) can accompany the confirmation email for security purposes.

Thereafter, if the purchase is made 1107, the transaction is undertaken between the seller and buyer. If the seller then fails to perform 1108, the buyer initiates 1109 the Claim Process (FIG. 12A).

FIG. 12A provides a flowchart overview of the Claim Process with reference to various sub-processes. Upon failure of the seller to perform 1201, the buyer must first request a refund 1202 directly from the seller. Failing to procure a refund 1203, the buyer then visits the Claims Page (HTML form hosted on Company site) to submit information pertaining to her claim 1204, including proof of her activation of protection under the bond or guaranty, certification that a refund has been requested from the seller and that the seller has denied the request, sale price, date, the nature of the defective performance, etc. Upon submission, a new record is created in the Claims Database 1304. If the information is complete 1205, the information submitted is automatically compared to the Registered User database information 1206 to determine whether the claimant currently owes the Company, e.g., if the claimant also has outstanding claims for which the Company has not been re-imbursed 1211. If money is owed, the claimant must pay all balances before the claim can be processed (1214, 1215, 1216). Once balances are paid, the Company staff reviews the merit of the claim 1210. If the claim is sufficient to support payment 1209, Staff contacts the seller 1213 to request direct refund by seller to buyer. If the claim does not support payment, the staff contacts the buyer to see whether the deficiency in the claim can be corrected (1208, 1207, 1225, 1212).

Once the seller has been contacted 1213, she may refund the buyer (1217, 1218), dispute the claim 1218 or neither. A dispute initiates the Claims Dispute Resolution process 1220 detailed in FIG. 12C. If no dispute is made or if claim is upheld in dispute, the Claim Payment and Collection Process (FIG. 12B) is followed 1224. If the dispute is upheld, the claim is rejected, and the parties are notified of the result 1223.

By the time a claim reaches the process in FIG. 12B (1231), it is ready for payment. After the Company has issued payment to the buyer (by check or otherwise) 1232, the Staff contacts the seller against whom the claim was made 1233. If the seller agrees to reimburse the Company 1235, she sends payment to Company 1234 and avoids cancellation of her current bonds and guaranties. If she does not so agree 1235, then her bonds and guaranties are cancelled 1236 and the credit card which she has on file is charged for the amount due 1239 as per the Bond or Guaranty contract. If the charge is not sufficient to cover the liability, the staff contacts the seller for the remaining balance due 1240. If the seller agrees to pay it at this time 1241, she can still avoid certain complications. If the seller disputes the credit card charges 1237 or refuses to pay any excess charges 1241, then the Company notifies the ISP or auction site involved 1244, suspends seller's account altogether 1243, and pursues legal action to collect 1246.

In all cases, the results are entered 1242 in a new record in the Notes Database 1311, including an entry in the Negative History field 1242, resulting in a newly adjusted Experience Rating.

If a claim is disputed by the seller, the Claim Dispute process depicted in FIG. 12C is followed. This process gives both the seller and buyer an opportunity to present their cases. The Company staff eventually decides whether to strike the claim or uphold it, and this result is returned to the main process depicted in FIG. 12A.

Figure 13:
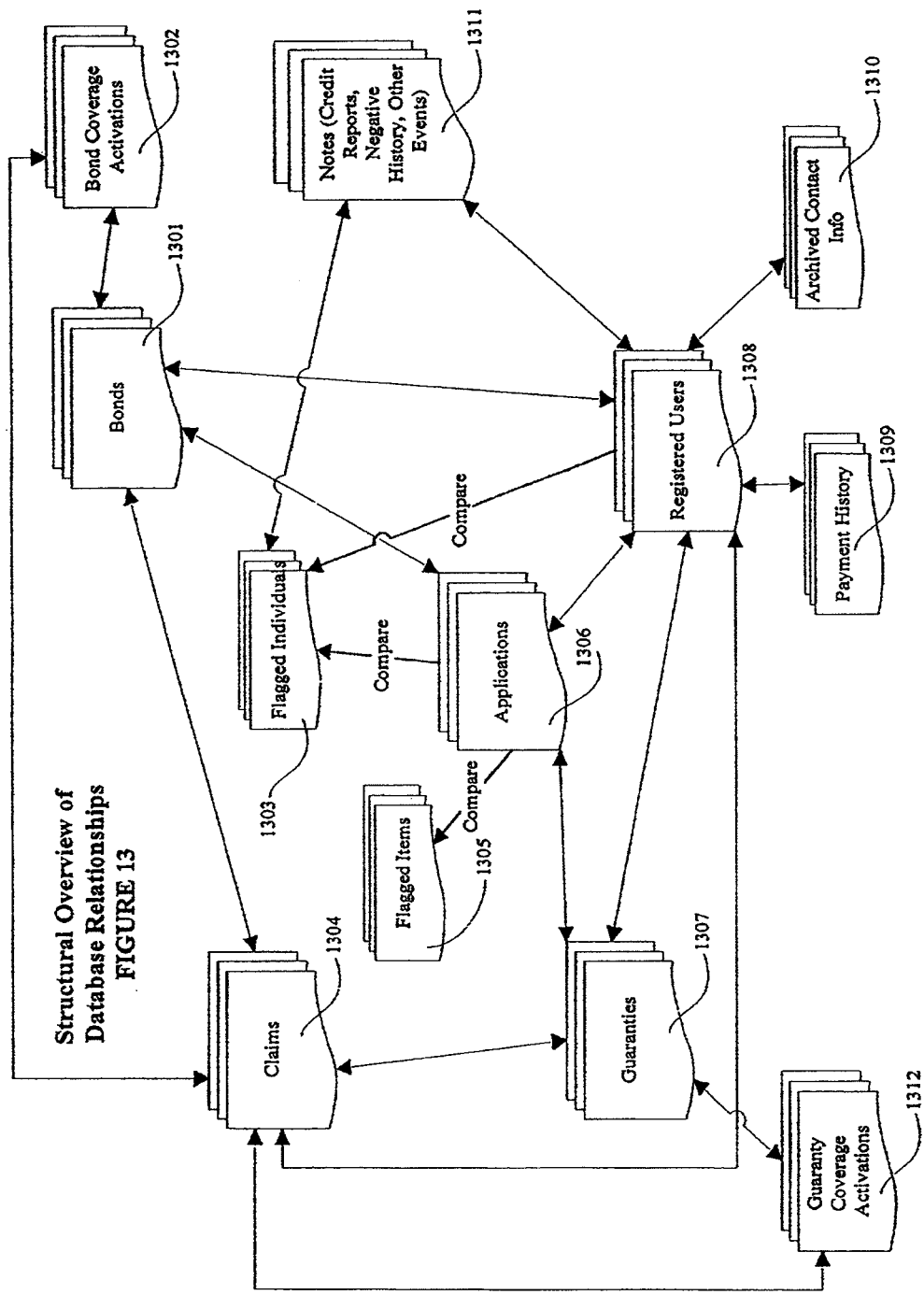
FIG. 13 depicts a high-level map of the databases used in the present invention, identifying the key relationships between them.

FIG. 13 depicts the core databases involved in storing and manipulating the information used in the present electronic bonding/guaranty invention. Principle relationships between records in a given database and records in another database are denoted with arrows and discussed briefly below.

Records in the Applications Database 1306 ("Database" hereinafter "DB") comprise fields for all data submitted by a given registered user for a given application. The given application is related to a specific record in the Registered Users DB 1308 by way of a unique registered user identification number, which is assigned to each record in the Registered User DB at time of creation. As known to those skilled in the art, records are said to be "related" when the data in the related field of a given record in a given first database matches the data in the related field of a given record in a second database. Once a database relationship is properly defined, such a data matching will cause data of the two related records to be linked.

Applications, when successful, result in the formation of new bonds and guaranties. Each new record in the Bonds DB 1301 and Guaranties DB 1307 is related to the record of in the Applications Database 1306 from which it spawned.

Certain identifying fields, such as email address, in the Applications Database 1306 may be related to a corresponding field, e.g., email address, in the Flagged Individuals DB 1303 so that applications submitted by undesirable applicants may be discovered prior to acceptance as per the Automated Guaranty and Bond Application review processes in FIGS. 6 and 7. Other fields in the Applications Database 1306, wherein the nature of the goods being sold is specified, may also be linked to corresponding fields in the Flagged Items DB 1305 to assist in avoiding underwriting transactions involving such items.

Records in the Registered Users DB 1308 are related to several other databases by way of the unique registered user identification number; these related databases include the Bonds DB 1301, Guaranties DB 1307, Payment History DB 1309, Archived Contact Info DB 1310, Claims DB 1304, and Notes DB 1311. Typically, the relationship is one to many: one record in the Registered User DB 1308 relates to multiple payments, multiple bonds, etc., while each payment, bond, etc., relates to only one registered user (as the Seller). Note, however, that a single record in the Notes DB 1311 may relate to multiple records in the Registered Users DB 1308. Note also that in order to file a claim, the claimant typically must have activated the protection of the bond or guaranty at the time of purchase, thereby creating a new record in the Bond Coverage Activations DB 1302 or Guaranty Coverage Activations DB 1312. At the d time of filing claim, the claimant must then become a registered user, if he or she has not already done so, thereby creating a new record in the Registered Users DB 1308. A given record in the Registered User DB 1308 may therefore relate to multiple claim records 1304 filed by a given user and, in a different relationship, multiple claims 1304 filed against that same user.

The records in Bonds 1301 and Guaranties DB's 1312 have a one-to-many relationship to the Claims DB 1304 and Coverage Activations DB's (1302, 1312), e.g., a single bond may produce multiple claims and activations, but a given claim or activation invokes the protection of only one bond or guaranty.

Less significant relationships are not depicted and should be apparent to one of ordinary skill in the art of data structure. Similarly, the many fields represented in each of the records of the various databases are not denoted by name or content in this document but should be apparent. Additional databases not depicted may also be employed to enhance the functionality of those depicted, according to the degree of sophistication the Company wishes to bring to bear upon the problem of accurately recording information pertaining to users, bonds and guaranties. For instance, for security purposes, the Company may wish to archive IP address information from which all bond or guaranty verification/activation click-throughs are received. Also, a Reports Database, in which a new record is created any time a report of suspicious activity is submitted to the through the Reports Page (not pictured), is contemplated.

FIGS. 14A through 14D depict flow charts detailing different revenue/money flow models through which the present invention can be readily funded and deployed for the benefit of all parties. The models are essentially self-explanatory.

Figure 14A:
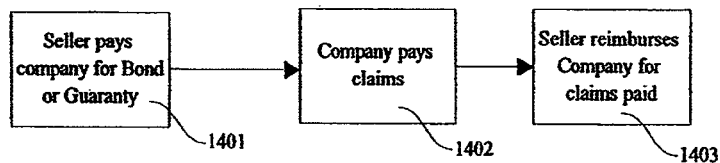
FIGS. 14A through 14D depict different revenue models to which the current invention can be applied.

FIG. 14A is that which is used in the preferred embodiment.

Figure 14B:
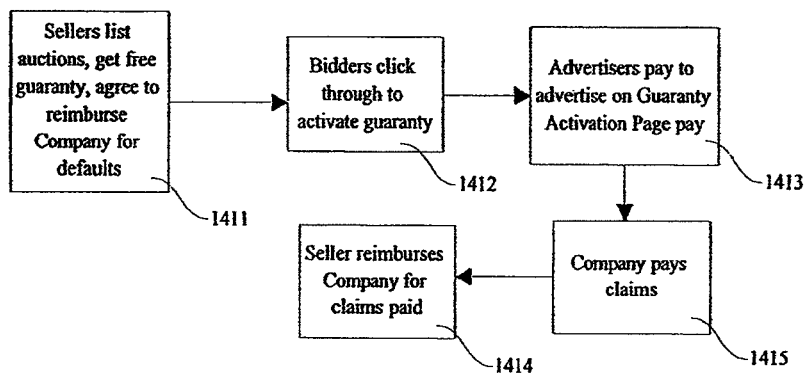

FIG. 14B is a promising alternative embodiment, since it provides guaranties which are free to both buyer and seller. Specifically, the cast of the quantity is paid for by advertisers, who pay for a banner ad 1002 on the Guaranty Verification and Activation page 1000. Of course, the seller must still agree to be ultimately responsible for any default on his part (1411, 1414).

Figure 14C:
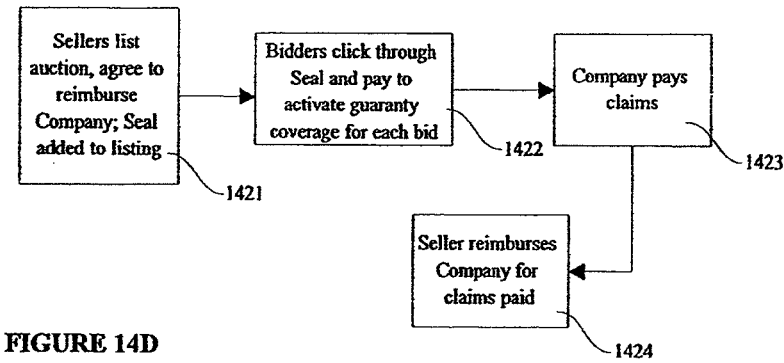

FIG. 14C presents a "buyer pays" model, where the bidder activates protection if he wants it and is willing to pay for it 1422. This model may well be the most efficient, simply because the purchasing decision is placed squarely on the shoulders of the party for whose benefit the bond or guaranty coverage exists.

Figure 14D:
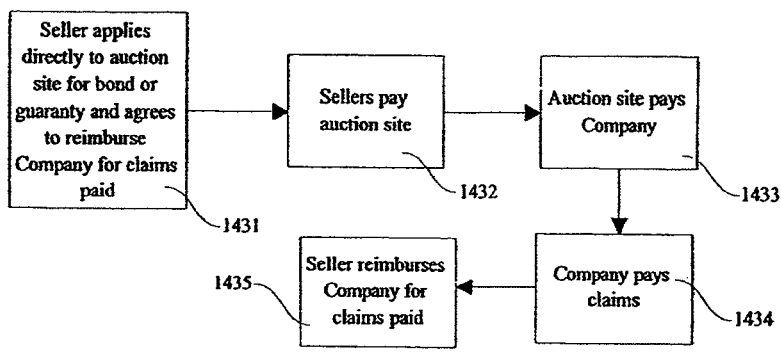

FIG. 14D presents a model wherein the Auctioneer handles the billing portion of the equation 1432, since the Auctioneer is presumably already billing the seller, the Auctioneer then outsources the rest of the work to Company. Alternately (not shown), the entire process can be handled by the Auctioneer providing its own bonds and guaranties and otherwise standing in the shoes of the Company.

It should be noted that different models can be mixed and matched or supplemented with other revenue models.

The present invention incorporates several security measures which are not graphically depicted. One primary risk to the Company in using the present invention comes from misappropriation of the bond or guaranty logo. Sellers who wish to avoid liability for claims made by aggrieved buyers but who wish to benefit from the appearance of being bonded or offering guaranteed auctions may attempt to pirate the company Seal and represent that they are covered when they are not. Thus, security measures include:

The Regenerating Seal. A Web browser "reads" HTML documents so as to display images when a proper reference to particular digital image, stored on a connected server, is made. The typical HTML code appears in a form similar to this: <img src=http://www.xxxx.com/image.gif>.

In the present invention, the Seal signifying a bond or guaranty includes a reference to a unique image, typically, a .jpg or .gif file, which is stored on the server of the Company. This image is that which is automatically generated for each bond or guaranty, and it contains the name, unique ID number, etc., as displayed in FIGS. 4B (411) and 4C (421). As depicted, this Seal image (411 or 421) indicates that the bond or guaranty it represents only covers purchases or bids made on a specified day.

The image (411 or 421) is regenerated each day at 12:01 am PST with the new day's date visible therein and a new, unannounced background and color scheme. The new image then replaces the previous day's image using the same URL or image address.

This daily image replacement allows properly referenced images to be continually renewed. Images which are not properly referenced, i.e., pirated, do not get replaced or updated. Thus, pirated images continue to display an expiration date which has already passed and a color/background scheme which is different from all active bonds and guaranties. This method does not eliminate the possibility of piracy but increases its difficulty and detectability.

Digital watermark*. Each image (411 or 421) used in a Seal is encoded so as to identify it as an image produced by and belonging to Company. Known search software can then be used to track the use of any such images containing this coding and thereby locate pirated images.

Text searching. The text (412 and 422) which appears under the Seal image (411 and 421) is an integral part of all valid Seals (410 and 420). Web text search and comparison software, such as that used by iParadigms in its plagiarism.org operations, can then be used by Company to detect any publications of this text which are not authorized.

Verification/Activation Page. The Verification/Activation process and page creates several protections. First, it puts a certain burden on purchasers to inspect that the seller is who he claims to be. Next, if a seller pirates this entire page in order to appear to be bonded or to have a valid guaranty, the page itself will appear at a URL hosted by someone other than Company, and, if it is referenced anywhere on the Web which makes it spider-able, Company text and/or image search software as described above will locate this unauthorized page. Even if the fake verification/activation page goes undetected, bidders who attempt to activate coverage will not receive a proper email confirmation from the Company, and may recognize that something suspicious is happening.

Community self-policing. As the electronic bond or guaranty becomes more familiar to the Internet purchasers, these purchasers will become more familiar with the proper appearance of the Company Seal and the Verification/Activation Page and will be able to recognize more readily when a Seal has expired or been misappropriated or when an entire Verification/Activation Page has been pirated and uploaded by someone other than Company. Thus, an easy self-policing mechanism is provided in each Seal: clicking on "Contact Us" immediately transports the user's browser to a Web form where a report can be made.

"Click-through" tracking. Known software enables tracking of traffic from one Web location to another. The Company can employ such software to determine where click-throughs are coming from, and these click-throughs can be compared to the database of URL's which have been authorized to display the Seal. If a given site is displaying the Seal without authority, this information will be automatically brought to the attention of Company staff.

I. Electronic Collateral Reservation Process Alternative Embodiment

FIG. 15 presents an overview of a process by which the Company's risk can be reduced by continuously preauthorizing a credit card charge in "chain" fashion such that there is essentially never a time throughout the duration of a bond when the Company does not have a preauthorized charge against the bonded seller's credit card in the amount of the full penal sum of a bond. Since this Electronic Collateral Reservation Process incorporates many of the processes already described above, the flowchart depicted in FIG. 15 is intended primarily to highlight only the differences in this alternative embodiment.

The user begins by completing a hand application choosing a coverage limit and specifying whether the bond should be automatically renewed upon expiration 1501. In this application, she can choose to use one credit card as the "collateral card," which will only be charged in the event of a default by the user, and another credit card to which payment for the bond will be billed, although the same card can be used for both purposes. Provided that the application is complete and otherwise acceptable, a charge to the collateral card in the amount of the full penal sum of the requested bond will be preauthorized 1502 and a charge to the billing card in the amount of the price of the bond will be preauthorized 1502. If both preauthorization are successful, i.e., not declined by the credit card issuer, then the bond application is accepted, the charge to the billing card finalized, and the bond contract becomes legally binding 1504. If either preauthorization fails or the bond application is insufficient on grounds described in reference to FIG. 6 or elsewhere, then the application is rejected 1503.

After a bond application has been accepted, the Company's risk period begins. The risk period is discussed in more detail below in reference to FIGS. 16A and 16B.

At regular, specified intervals from the beginning through the end of the risk period, the Company will follow a "re-preauthorization" procedure 1512. This procedure has two basic steps: first, the existing preauthorization, initially made when the bond application was accepted, of a charge to the collateral card in the amount of the total penal sum is canceled. This step may be achieved by closing out the preauthorized charge as an actual $1 charge and then immediately voiding this $1 transaction. The second step of the re-preauthorization procedure 1512 is executed immediately thereafter: a new preauthorization of a charge to the collateral card in the amount of the full penal sum of the user's bond is performed. The new preauthorization can also be made immediately before the existing one is canceled, if the given user's credit limit will allow it.

This procedure 1512 allows the Company to maintain a virtually uninterrupted reservation of a certain portion of the total credit available to the collateral card account. This procedure is made necessary by the fact that preauthorization of credit card charges usually expire within a few days of preauthorization.

Once the risk period has ended 1505, the re-preauthorization cycle discontinues 1518.

Upon the expiration of a bond 1506 for which the user has selected automatic renewal 1507, the billing card is charged 1508. If the billing card is declined 1509, a suspension notice is sent to the user 1510 indicating that the bond will be suspended for lack of payment unless payment is provided within a certain number of days. Upon payment, the bond will be reinstated.

If preauthorization of the collateral card fails 1513, the bond is suspended 1514 until such time as the user provides new, valid credit card information, at which time the bond will be reinstated 1516, provided that the bond itself has not expired. If the user fails to provide a new valid credit card 1513, then the user's Experience Rating will be affected, and the user will not be able to purchase additional bonds until such time as the failure is remedied 1512. If preauthorization of the collateral card is successful 1513 and the risk period has not ended 1505, then the re-preauthorization 1512 cycle continues.

Figure 16A:
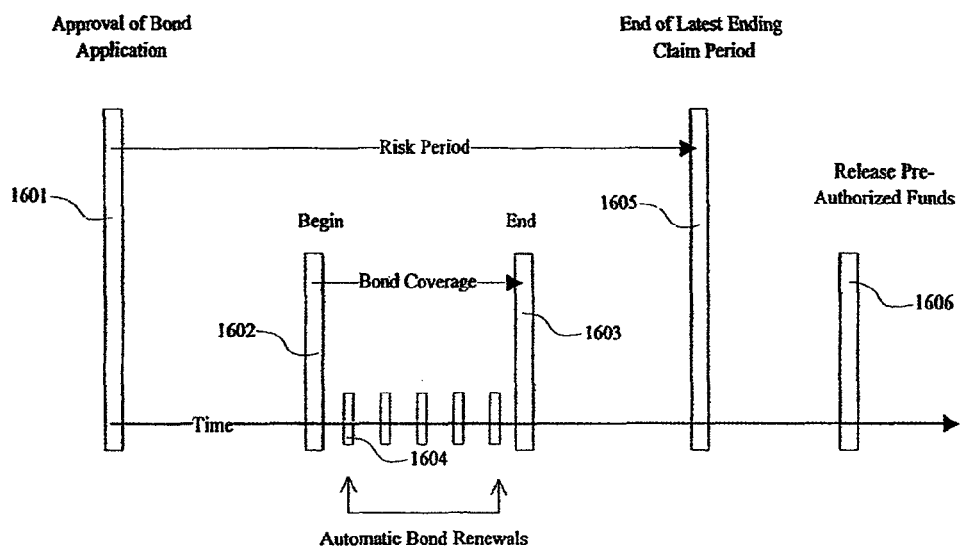
FIG. 16A presents a timeline illustrating the relationship of a bond to the Company's risk exposure as a result of that bond.

FIG. 16A presents a timeline tying together much of the above discussion. The Company's risk period is that time period between the moment of approval of a bond application 1601 and the last moment at which filing of a viable, timely claim against that bond by an aggrieved buyer is possible 1605. If the Company is using the Electronic Collateral Reservation Process described in FIG. 15, it should reserve funds in the collateral card account throughout the risk period, and this reservation can be released 1606 any time after the risk period has ended 1605.

In FIG. 16A, a bond application is approved 1601, but the applicant has requested that bond coverage not become active until sometime later 1602. The applicant has also requested that the bond be automatically renewed upon expiration, and thus, in the example of a one month bond model, the bond becomes active 1602, expires at the end of one month, and then is automatically renewed immediately 1604. This automatic renewal occurs several times until finally the bonded seller requests that automatic renewal be discontinued. When the then-current month ends, the bond expires and is not renewed, and therefore the bond coverage ends 1603. The Company's risk period, however, may not end until sometime thereafter, since claims can be filed for bonded transactions that occurred during the active life of the bond coverage for a certain period of time after bond coverage has ended 1603, as illustrated in the following FIG. 16B.

Figure 16B:
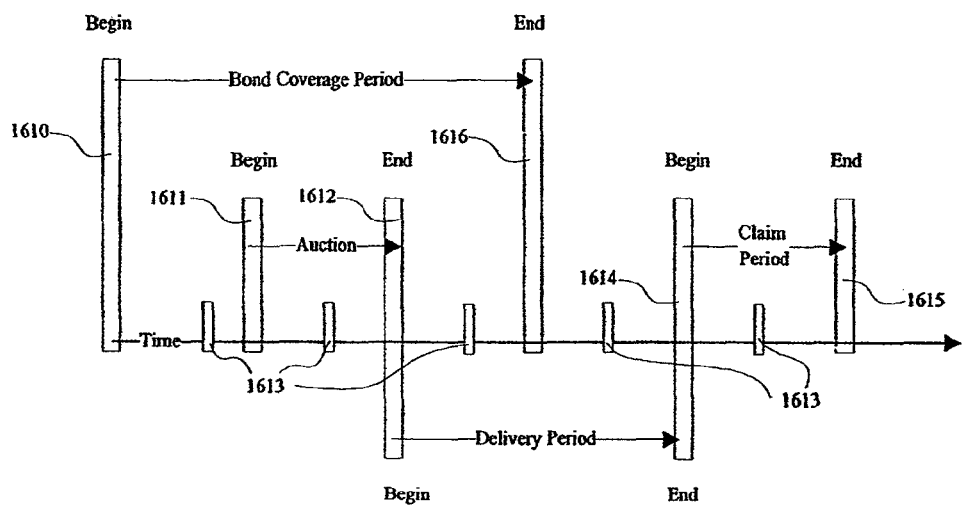
FIG. 16B presents another timeline illustrating an example of the relationship between the time period during which a bond is effective and the time period during which a claim against that bond can be made.

FIG. 16B depicts another scenario in timeline fashion. In this case, the bond applicant chooses that the bond become active immediately upon acceptance, and therefore the bond coverage period and the risk period begin simultaneously 1610. As per the Electronic Collateral Reservation Process, re-preauthorization of the collateral card charge occurs at regular intervals 1613 thereafter. The bonded seller then lists an auction that begins 1611 and ends 1612 during the bond coverage period. Although it is not necessary, the Company should probably require that auctions both begin and end during the bond coverage period in order for bond coverage to lie. Once the auction has ended 1612, the time period allotted for delivery of the purchased item from seller to buyer begins 1612. A purchaser may not file a claim until this delivery period has ended 1614, at which time the claim period begins 1614. The purchaser then has a certain number of days during which she can file a claim under the bond, after which time the claim period ends 1615, and no more claims can be filed against the given expired bond. Thus, in this example, where the bonded seller has run but a single auction, the Company's risk period ends when the claim period associated with that auction ends 1615. Note that the delivery period and the claim period both extend well beyond the expiration of the bond 1616, and therefore the re-preauthorization cycle 1613 continues also. In the case of bonds which are not associated with an auction site the bond claim period will simply extend for a fixed period of time after the end of the bond coverage period rather than being tied to any transaction.

If a claim is filed during the claim period, however, then the Company's risk period will be extended indefinitely until the claim is resolved, and the re-preauthorization cycle will continue accordingly.

If multiple claims are made against a single bond, the Company will need to make a business decision regarding whether to charge the seller's card the entire penal sum and divide the resulting funds amongst claimants, refunding any remainders to the card once all claims are extinguished, or to charge the value of each claim as a separate charge against the collateral card up to an aggregate sum equaling the penal sum.

II. Integrated Auction Bonding Method

The preferred embodiment as described above allows the identifying Seal of a bond to be added to any HTML page, including both the homepage of the bonded seller and auctions she uploads on a third party auction site. However, the security measures described may not be enough to prevent unauthorized uses—piracy—of the bond Seal. This problem can be partly remedied through the use of an alternative embodiment wherein the third party auction site operator, such as eBay (hereinafter, "Auctioneer"), itself serves up a condensed version of the bond Seal rather than the Seal being served by the Company's servers. Such an approach makes use of the fact that certain parts of the HTML page in which an online auction is presented are under the exclusive control of the Auctioneer itself, as opposed to the section of content that can be manipulated by the auction site user. Thus, if the only legitimate Seals are those which are served in an "exclusive control" area, then pirated Seals will be obvious and basically pointless.

Serving of the Seal by the Auctioneer is made possible by the Integrated Auction Bonding Method disclosed in the following figures. In this alternative embodiment, a high speed data link is established between the servers of the Company and those of the Auctioneer. This link allows database replication, meaning that certain fields of records in the Company's bond database are mirrored in a separate bond database under the control of the Auctioneer.

Figures 17A, 17B:
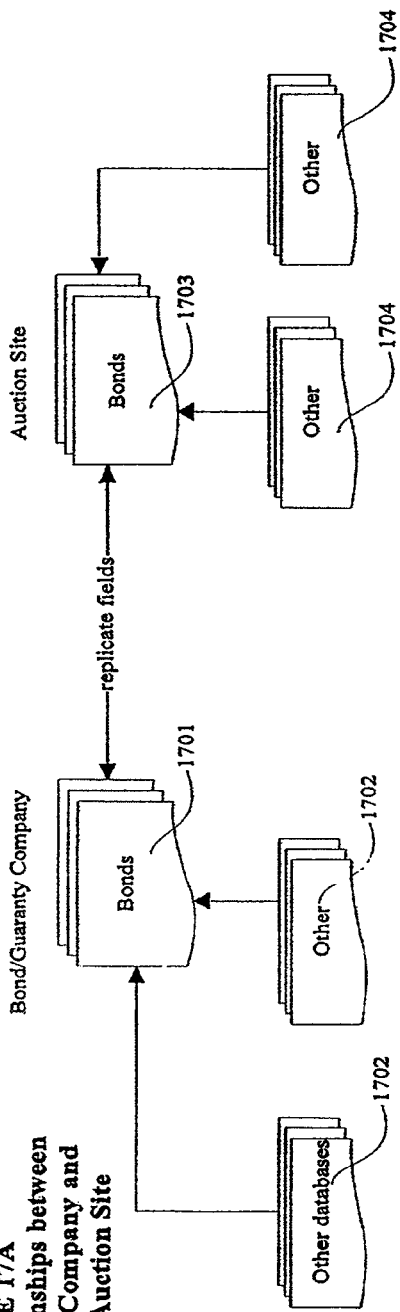
FIG. 17A depicts a map of the database relationship that enables co-operation of and data sharing by an auction site and a bonding company.
FIG. 17B depicts an excerpt from an HTML page that is an auction listing, wherein a special seal evidencing a bond is displayed.

FIG. 17A depicts a simple portrayal of this database relationship. The Company's databases, including the Bonds Database 1701 and other related databases 1702 discussed in this document, appear on the left. On the right are the databases of the Auctioneer, including the Mirror Bonds Database 1703 and such other databases 1704 as the Auctioneer uses in its own operations, all of which reside on the Auctioneer's hardware. The Company's Bonds Database 1701 is the master database from which the Mirror Bonds Database 1703 derives continually updated information. Only a few fields in the Company's Bonds Database 1701 are replicated in that of the Auctioneer 1703, namely: (1) is the bond currently in effect; (2) what is the coverage limit of the bond; (3) what is the bonded seller's unique auction site username or other control value/ID; and (4), if there may be large delays between updates of the information in the Mirror Bonds Database 1703, when is the bond scheduled to expire. Ideally, this last piece of information need not be stored by the Auctioneer but rather the coverage limit field would be continually updated in real-time and reduced to $0 immediately upon bond expiration. Additional fields may be stored to enhance the functionality, granularity, accuracy or speed of the system as a whole.

Note that the Company must make a business decision regarding whether to withdraw bond coverage from auctions that are already running when a bond is prematurely canceled (re-preauthorization fails, for instance).

As with other icons typically served next to the username of a seller, whenever that username appears on an auction site, such as the reward stars served next to the usernames of prolific sellers on eBay, the condensed bond Seal is called every time the bonded seller's username appears on the Auctioneer's site. When this call is made, the Auctioneer's databases are queried to determine whether the given seller is bonded, and if so, what is the coverage limit of the bond. In cases where the seller is bonded, the bond Seal is served. This Seal can simply serve to demonstrate that the seller is bonded, or it can display additional information, such as the difference between the penal sum and the sum total of aggregated potential claims against the bond as determined through the Bond Margin Gauge process described in reference FIG. 18 below.

FIG. 17B shows a fragment of an example HTML page that is an auction listing on the Auctioneer's site, which is being operated in cooperation with the Company per the Integrated Auction Bonding Method. The seller in this example has a unique username "JoeSeller" 1711 and has been awarded a user rating 1712 and an achievement star 1713 by the Auctioneer. As is typical, the user rating 1712 is a real-time updated text value, and the achievement star 1713 is an image file served next to the username 1711 of any sellers to whom it has been awarded. Next to these other icons is the Seal 1714, which demonstrates that the given seller is bonded and that his bond margin, a dynamically updated, real-time value, is $4690.00. This number is the purpose of the Bond Margin Gauge.

Each time the Seal, including the Bond Margin Gauge, is called to appear in an HTML document per request by a client computer to the Company's server, certain information is retrieved and processed from the Auctioneer's databases, specifically: the bonded seller's coverage limit, the high bid in all currently running bonded auctions (including, in the case of a Dutch auction, the top X bids where X is the number of items being auctioned in the Dutch auction), and the winning bid in all closed bonded auctions for which the risk period has not expired. The sum total of all high bids in all currently running bonded auctions and all winning bids in closed auctions for which the risk period has not yet expired is subtracted from the penal sum of the seller's bond to leave a difference which represents how much bond "headroom" is available under the seller's bond. This number is then displayed in the Seal automatically appearing next to the seller's username. This number is useful to potential bidders, since competing claims against the bond could reduce the availability of funds against which an aggrieved buyer could claim in the event of default.

Figure 18:
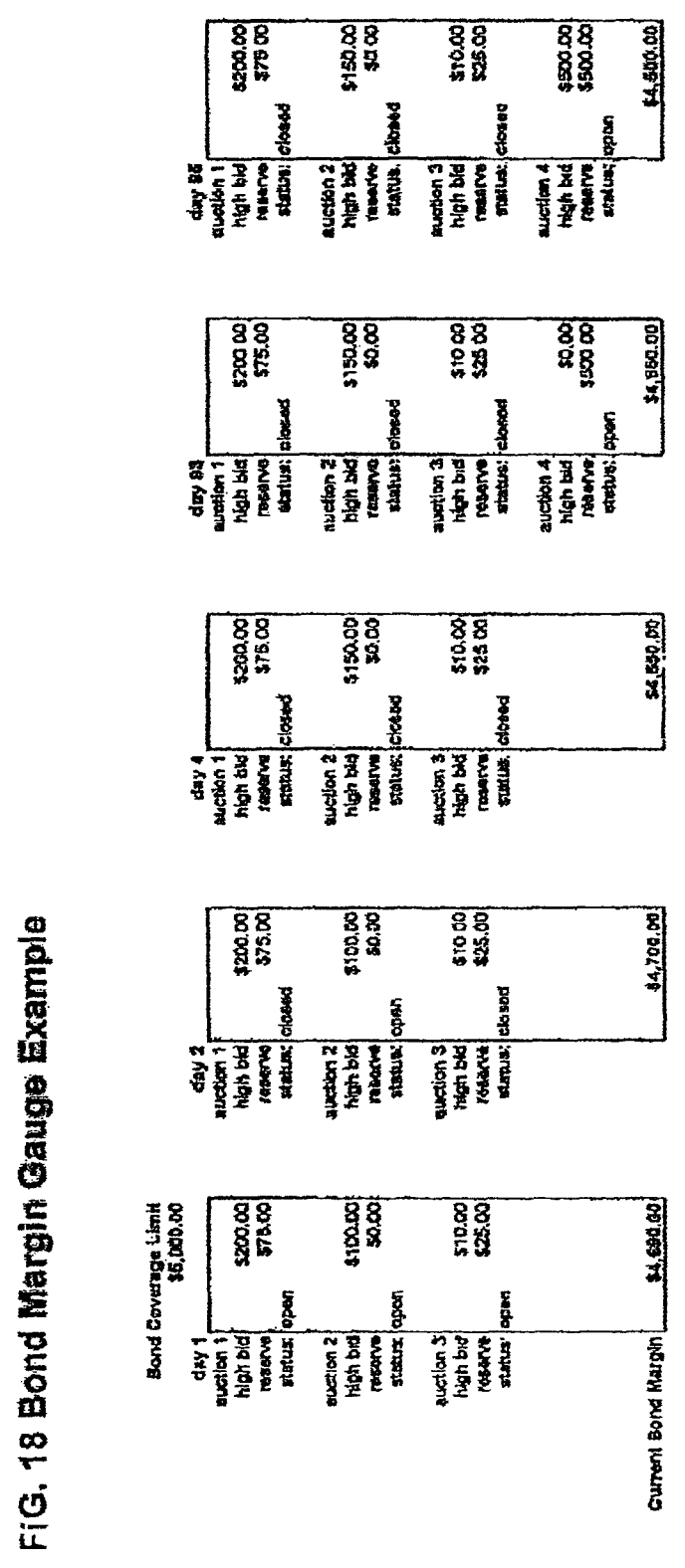

FIG. 18 presents an example of the Bond Margin Gauge in action. On Day 1, JoeSeller (1711 in FIG. 17B) has three running auctions, two of which have met the reserve. The bonded seller's coverage limit is $5000.00, and the sum of the three high bids is $310.00. The Bond Margin Gauge therefore reads $4690.00. On Day 2, two of the auctions have closed, one of which did not meet the reserve, auction 3. Since auction 3 has closed without a winner, the high bid in that auction no longer counts against the seller's bond margin. The sum total of the winning bid in auction 1, which has closed, and auction 2, which is still open, is $300, and the bonded seller's currently available margin as measured by the Bond Margin Gauge is therefore $4700. By day 4, auction 2 has also closed with a high bid of $150.00, and the Bond Margin Gauge reads $4650.00.

On Day 93, JoeSeller (1711 in FIG. 17B) lists a new auction which currently has no bids. The risk period for auction 1 has ended, and therefore the winning bid in that auction no longer counts against the seller's bond margin. However, the risk period for auction 2 has not yet ended, and therefore the seller's bond margin equals $4850. By day 95, the risk period for auction 2 has ended, and auction 4 has a high bid of $500, resulting in a bond margin of $4500 for the given bonded seller.

III. Bidder Payment Bonding and Deposit Accounts

To this point, the present invention disclosure has dealt primarily with the bonding of Internet merchants to protect buyers in cases of merchant default. FIG. 19 depicts an alternative embodiment of the current invention adapted for bonding bidders.

After the user has registered with the Company 1901 and her credit card or cards have been preauthorized 1902, the bidder can choose to open a deposit account 1904, specifying an amount of funds to be deposited with the Company 1905. This amount is charged to the bidder's credit card 1905, and the bidder's deposit account shows a credit for these funds.

It should be noted that a Bond Seal for a bonded bidder preferably appears next to the given bidder's username, just as Bond Seals appear next to the seller's username when a seller is bonded. The Bond Seal used to indicate that a bidder is bonded can, but does not have to include a margin counter displaying a value representing the difference between the bidder's total coverage and the sum total of her outstanding bids. The outstanding bids include any winning bids in closed auctions wherein it is still possible for an aggrieved seller to claim against the bidder's bond.

It is typically possible for the same auction site account to be used for both buying and selling activities, and, therefore, one type of Bond Seal appears next to the given username when that user is acting as a bidder. Another type of Bond Seal is displayed when the given user is acting as a seller, provide, of course, that the given user is covered by both an applicable merchant bond and a bidder bond.

It is to be further understood that the seller can, if required, activate the buyer's bond upon acceptance of the buyer's bid by linking to the online site by clicking through the Seal and following the coverage activation procedures described in greater detail above for activating coverage of the seller's bond by the buyer.

Whether or not the bidder has elected to open a deposit account, the bidder is then given the choice between a preferred bond and a standard bond 1907. The standard bond, providing but a small amount of coverage, is free and has no set expiration date. A preferred bond must be paid for upon initiation and at periodic renewals, but the coverage limit available to the bidder is much higher. A preferred bond is handled essentially like the sellers' bonds above via the re-preauthorization cycle (see 1512 in FIG. 15): the charge for the full penal sum is preauthorized on the collateral card 1909, the fee for the bond is charged to the billing card 1910, and re-preauthorization of the collateral card is repeated periodically thereafter 1911. If the bidder chooses a standard bond 1914, the re-preauthorization cycle is not used, but the card is checked once every few weeks to see that it remains valid 1915.

The deposit account is used to allow immediate payments to be made electronically and automatically by the Company directly to a bonded seller at the moment a bonded bidder with a deposit account wins an auction listed by the given bonded seller, provided that funds in the deposit account exceed the price of the winning bid.

FIG. 20 provides a flowchart that ties together the complex interactions of the various embodiments described above when several of these technological methods are deployed simultaneously. When an auction closes 2001 wherein the seller is bonded 2002, if the bidder is also bonded and has deposited funds in a deposit account sufficient to cover the price of the winning bid 2013, payment will be wired automatically to the seller immediately after the auction closes 2014. If no such deposit account funds are available 2013 but the bidder later pays the seller 2015 and the seller delivers 2017, then the transaction has gone well, and the Company does not get involved 2004, just as if neither the seller 2002 nor the bidder 2003 were bonded at all 2004. If a bonded seller fails to deliver 2017, then the claim process depicted in FIG. 12A is followed. In cases where the bidder is bonded 2003/2016 but fails to pay 2005/2015, the seller must file a claim against the bidder's bond during the claim period 2006. If the bidder does not correct her default 2007, the seller must deliver the item purchased in the auction to the Company 2008. Upon satisfactory delivery, the seller will be paid by the Company 2009, and the bidder's collateral card charged 2010, both for the amount of the bid price and for a default premium whereby the Company profits from having served as a surety for the defaulting bidder. Thereafter, the purchased item can be sent to the bidder by the Company if desired. If the bidder's collateral card is declined 2010, then the bidder is contacted, and the Company's chosen collection methods are employed.

Alternately (not depicted), the seller can sell the purchased item to the next highest bidder in case of default by the winning bidder, if this next highest bidder can be found, in which case the Company would reimburse the seller her transaction costs in finding another buyer and charge the defaulting bonded bidder for these costs in addition to a premium.

Another alternative (not depicted) provides that when sellers are listing auctions on the Auctioneer's site, they are offered the option to allow only bonded bidders, or only bonded bidders with deposit accounts, to bid on the auction. The Auctioneer's databases will then be checked when a bidder places a bid to see whether that bidder is bonded before the bid will actually be placed.

Another option that can be offered to sellers by the Auctioneer at listing time is to allow automatic discounts—2% off the price of winning bid, for instance—for any bidders who are bonded. Some auctions already allow sellers to offer discounts to the first bidder in a given auction.

Various embodiments of the of the present invention have been described herein. It should be understood by those of ordinary skill in the art, however, that the above described embodiments of the present invention are set forth merely by way of example and should not be interpreted as limiting the scope of the present invention, which is defined by the appended claims. Many other alternative embodiments, variations and modifications of the foregoing embodiments that embrace various aspects of the present invention will also be understood upon a reading of the detailed description together with the Figures. For instance, it will be understood that features of one embodiment may be combined with features of other embodiments while other features may be omitted (or replaced) as being nonessential to the practice of the present invention.

What is claimed is:

1. A method for providing security in a client-server environment, comprising:
receiving, via the client-server environment, a request for an electronic seal;
creating, by a processor, the electronic seal after receiving the request,
wherein the electronic seal is displayable within an electronic document in the client-server environment to provide a certification for the electronic document in the client-server environment,
the electronic seal includes a link that is clickable in the client server-environment, and
at least one of the electronic seal and the link indicates a validity period of the certification.

2. The method according to claim 1, wherein the validity period includes a date.

3. The method according to claim 2, wherein the electronic seal includes an image that indicates the date.

4. The method according to claim 3, wherein the image is configured to be replaced with a new image that indicates a next date at an end of the date.

5. The method according to claim 1, wherein the electronic seal is configured to display a verification document in the client-server environment when the electronic seal is selected from within the electronic document in the client-server environment.

6. The method according to claim 5, wherein the verification document is configured to be hosted by a first host different than a second host of the electronic document, the request for the electronic seal being received by the first host and the electronic seal being created by the first host.

7. The method according to claim 6, wherein the electronic seal that is displayable within the electronic document in the client-server environment indicates the first host.

8. The method according to claim 1, wherein the electronic seal is configured to display a verification document in the client-server environment when the link is clicked from within the electronic document in the client-server environment.

9. The method according to claim 1, wherein the processor adds the electronic seal to the electronic document.

10. The method according to claim 1, wherein the electronic document includes an offer for sale.

11. The method according to claim 10, wherein the electronic seal includes a guaranty for the offer for sale.

12. The method according to claim 11, wherein the guaranty is configured to be activated by a potential buyer of the offer for sale.

13. The method according to claim 10, wherein the electronic seal confirms an identity of a host of the electronic document that includes the offer for sale.

14. The method according to claim 1, further comprising:
evaluating, by the processor, at least one of a background and an identity of a host of the electronic document before creating the electronic seal.

15. The method according to claim 1, further comprising:
storing, in a data storage, the electronic seal in association with a uniform resource locator of the electronic document.

16. The method according to claim 1, wherein the electronic seal includes text that is searchable in the client-server environment.

17. The method according to claim 16, further comprising:
searching, by the processor, the client-server environment for the text included in the electronic seal for detecting unauthorized publications of the electronic seal.

18. A server computer for providing security in a client-server environment, comprising:

a receiver that receives a request for an electronic seal via the client-server environment; and a processor that creates the electronic seal after the receiver receives the request;

wherein the electronic seal is displayable within an electronic document in the client-server environment to provide a certification for the electronic document in the client-server environment, the electronic seal includes a link that is clickable in the client server-environment, and at least one of the electronic seal and the link indicates a validity period of the certification.

19. The server computer according to claim 18, wherein the validity period includes a date, and the electronic seal includes an image that indicates the date.

20. The server computer according to claim 18, wherein
the electronic seal is configured to display a verification document in the client-server environment when the electronic seal is selected from within the electronic document in the client-server environment, and
the verification document is configured to be hosted by a first host different than a second host of the electronic document.

21. The server computer according to claim 18, wherein
the electronic document includes an offer for sale, and
the electronic seal includes a guaranty for the offer for sale.

22. The method according to claim 1, wherein the electronic document is an HTML document.

23. The server computer according to claim 18, wherein the electronic document is an HTML document.

* * * * *